(12) United States Patent
Katayama et al.

(10) Patent No.: US 10,875,558 B2
(45) Date of Patent: Dec. 29, 2020

(54) ON-RAIL TRAIN MANAGEMENT SYSTEM, GROUND APPARATUS, AND TRAIN MANAGEMENT METHOD

(71) Applicant: KYOSAN ELECTRIC MFG. CO., LTD., Yokohama (JP)

(72) Inventors: Jun Katayama, Yokohama (JP); Toshifumi Nishi, Yokohama (JP); Kenji Mizuno, Sagamihara (JP); Tomonori Itagaki, Kawasaki (JP); Kaoru Oshima, Tokyo (JP); Tamotsu Yokoyama, Yokohama (JP)

(73) Assignee: KYOSAN ELECTRIC MFG. CO., LTD., Yokohama (JP)

( * ) Notice: Subject to any disclaimer, the term of this patent is extended or adjusted under 35 U.S.C. 154(b) by 272 days.

(21) Appl. No.: 16/185,193

(22) Filed: Nov. 9, 2018

(65) Prior Publication Data

US 2019/0077430 A1 Mar. 14, 2019

Related U.S. Application Data

(63) Continuation of application No. PCT/JP2016/064112, filed on May 12, 2016.

(51) Int. Cl.
*B61L 23/14* (2006.01)
*B61L 27/00* (2006.01)
(Continued)

(52) U.S. Cl.
CPC ......... *B61L 27/0011* (2013.01); *B60L 3/0076* (2013.01); *B60L 15/40* (2013.01);
(Continued)

(58) Field of Classification Search
CPC ................. B60L 15/40; B60L 2200/26; B60L 2240/622; B60L 2250/10; B60L 3/0076;
(Continued)

(56) References Cited

U.S. PATENT DOCUMENTS 6,511,023 B2* 1/2003 Harland ................ B61L 25/021
246/122 R
2012/0051643 A1* 3/2012 Ha .......................... G06K 9/325
382/182

(Continued)

FOREIGN PATENT DOCUMENTS

JP H11-192948 A 7/1999
JP 2003-002205 A 1/2003
(Continued)

*Primary Examiner* — Mark T Le
(74) *Attorney, Agent, or Firm* — Muncy, Geissler, Olds & Lowe, P.C.

(57) ABSTRACT

When there is a train entering a building of a rail yard, a ground apparatus stores vehicle-formation-set IDs of respective vehicle-formation-sets of the train in the entering order by a FILO method. Additionally, when there is the train leaving the building, the vehicle-formation-set IDs are sequentially read by the FILO method, an inquiry addressed to the vehicle-formation-set IDs is transmitted in the order of the reading to obtain the train information from the on-board apparatus of each of the vehicle-formation-sets forming the train. When the on-board apparatus does not respond to the inquiry, and obtaining of the train information fails, the ground apparatus performs a predetermined alarm output control.

4 Claims, 13 Drawing Sheets

(51) Int. Cl.
*B61L 15/00* (2006.01)
*B60L 3/00* (2019.01)
*B60L 15/40* (2006.01)
*B61L 25/02* (2006.01)
*B61L 25/04* (2006.01)

(52) U.S. Cl.
CPC ....... *B61L 15/0027* (2013.01); *B61L 15/0072* (2013.01); *B61L 23/14* (2013.01); *B61L 25/028* (2013.01); *B61L 25/048* (2013.01); *B61L 27/0005* (2013.01); *B61L 27/0077* (2013.01); *B60L 2200/26* (2013.01); *B60L 2240/622* (2013.01); *B60L 2250/10* (2013.01)

(58) Field of Classification Search
CPC .. B61L 15/0027; B61L 15/0072; B61L 23/14; B61L 25/028; B61L 25/048; B61L 27/0005; B61L 27/0011; B61L 27/0077; B61L 2205/04; B61L 15/00; B61L 25/02; B61L 25/04; B61L 27/0088; B61L 27/0094
See application file for complete search history.

(56) References Cited

U.S. PATENT DOCUMENTS

| | | |
|---|---|---|
| 2014/0180510 A1 | 6/2014 | Fournier et al. |
| 2015/0360700 A1 | 12/2015 | Cooper et al. |
| 2016/0272228 A1* | 9/2016 | LeFebvre ............ B61L 15/0027 |

FOREIGN PATENT DOCUMENTS

| | | |
|---|---|---|
| JP | 2012-106571 A | 6/2012 |
| WO | 2015/081278 A1 | 6/2015 |

\* cited by examiner

ON-RAIL TRAIN MANAGEMENT SYSTEM, GROUND APPARATUS, AND TRAIN MANAGEMENT METHOD

CROSS REFERENCE TO RELATED APPLICATION

This application is a continuation of International Patent Application No. PCT/JP2016/064112, having an international filing date of May 12, 2016, which designated the United States, the entirety of which is incorporated herein by reference.

BACKGROUND

In the railways, recently, train control systems using wireless communication have been developed. For example, in the technology of JP-A-2012-106571, while an on-board control apparatus, which is an on-board apparatus, performs broadcast transmission of train-side information to a ground side, a base apparatus, which is a ground apparatus, generates control information for each train, and transmits the control information to the train when the train-side information is received from each train. Then, each train receives the control information for the train itself, and controls the train.

However, in the train control system using wireless communication as in JP-A-2012-106571, there is a problem that the management cannot be performed on trains existing at a location where wireless communication between the on-board apparatus and the ground apparatus is impossible or difficult. For example, in a building of a rail yard where electric waves do not reach and thus is outside a communication coverage area, and when the vehicle's power is cut off for inspection, etc., in the building, the wireless communication between the on-board apparatus and the ground apparatus becomes impossible. Therefore, while the train is parked in the building, it is difficult for the ground apparatus to positively identify the on-rail status (position) of the train by wireless communication with the on-board apparatus. Moreover, the train entering the building does not always leaves the building with the same formation as is, because the formation operation, such as coupling of trains or separation (division) of trains, is properly conducted in the building.

SUMMARY

According to the first aspect of the invention, there is provided an on-rail train management system comprising an on-board apparatus and a ground apparatus, wherein wireless communication between the on-board apparatus and the ground apparatus being impossible or difficult when a train enters a building of a rail yard, but possible in commercial operation, the train being formed by one or more vehicle-formation-sets, the on-board apparatus being mounted on each of the vehicle-formation-sets, and executing storing IDs of the vehicle-formation-sets, transmitting train information including the IDs of the vehicle-formation-sets to the ground apparatus in response to an inquiry from the ground apparatus, and performing a predetermined emergency stop control when determining that there is not the inquiry from the ground apparatus after leaving the building, and the ground apparatus executing, when there is the train entering the building, storing the IDs of the respective vehicle-formation-sets of the train in an entering order by a FILO (First-In-Last-Out) method, when there is the train leaving the building, sequentially reading the IDs by the FILO method, performing the inquiry based on the IDs in the order of the reading to obtain the train information from the on-board apparatus of each of the vehicle-formation-sets forming the train, and performing a predetermined alarm output control when the on-board apparatus does not respond to the inquiry, and obtaining of the train information fails.

According to the second aspect of the invention, there is provided a ground apparatus of an on-rail train management system comprising an on-board apparatus and the ground apparatus, wireless communication between the on-board apparatus and the ground apparatus being impossible or difficult when a train enters a building of a rail yard, but possible in commercial operation, the train being formed by one or more vehicle-formation-sets, the on-board apparatus being mounted on each of the vehicle-formation-sets, and executing storing IDs of the vehicle-formation-sets, transmitting train information including the IDs of the vehicle-formation-sets to the ground apparatus in response to an inquiry from the ground apparatus, and performing a predetermined emergency stop control when determining that there is not the inquiry from the ground apparatus after leaving the building, when there is the train entering the building, storing the IDs of the respective vehicle-formation-sets of the train in an entering order by a FILO (First-In-Last-Out) method, when there is the train leaving the building, sequentially reading the IDs by the FILO method, performing the inquiry based on the IDs in the order of the reading to obtain the train information from the on-board apparatus of each of the vehicle-formation-sets forming the train, and performing a predetermined alarm output control when the on-board apparatus does not respond to the inquiry, and obtaining of the train information fails.

According to the third aspect of the invention, there is provided a train management method in an on-rail train management system comprising an on-board apparatus and a ground apparatus, wireless communication between the on-board apparatus and the ground apparatus being impossible or difficult when a train enters a building of a rail yard, but possible in commercial operation, the train being formed by one or more vehicle-formation-sets, the on-board apparatus being mounted on each of the vehicle-formation-sets, and storing IDs of the vehicle-formation-sets, the train management method comprising:

transmitting, by the on-board apparatus, train information including the IDs of the vehicle-formation-sets to the ground apparatus in response to an inquiry from the ground apparatus, when there is the train entering the building, storing, by the ground apparatus, the IDs of the respective vehicle-formation-sets of the train in an entering order by a FILO (First-In-Last-Out) method, when there is the train leaving the building, sequentially reading, by the ground apparatus, the IDs by the FILO method, performing the inquiry based on the IDs in the order of the reading to obtain the train information from the on-board apparatus of each of the vehicle-formation-sets forming the train, performing, by the ground apparatus, a predetermined alarm output control when the on-board apparatus does not respond to the inquiry, and obtaining of the train information fails, and performing, by the on-board apparatus, a predetermined emergency stop control when determining that there is not the query from the ground apparatus after leaving the building.

DESCRIPTION OF EXEMPLARY EMBODIMENTS

Figure 1:
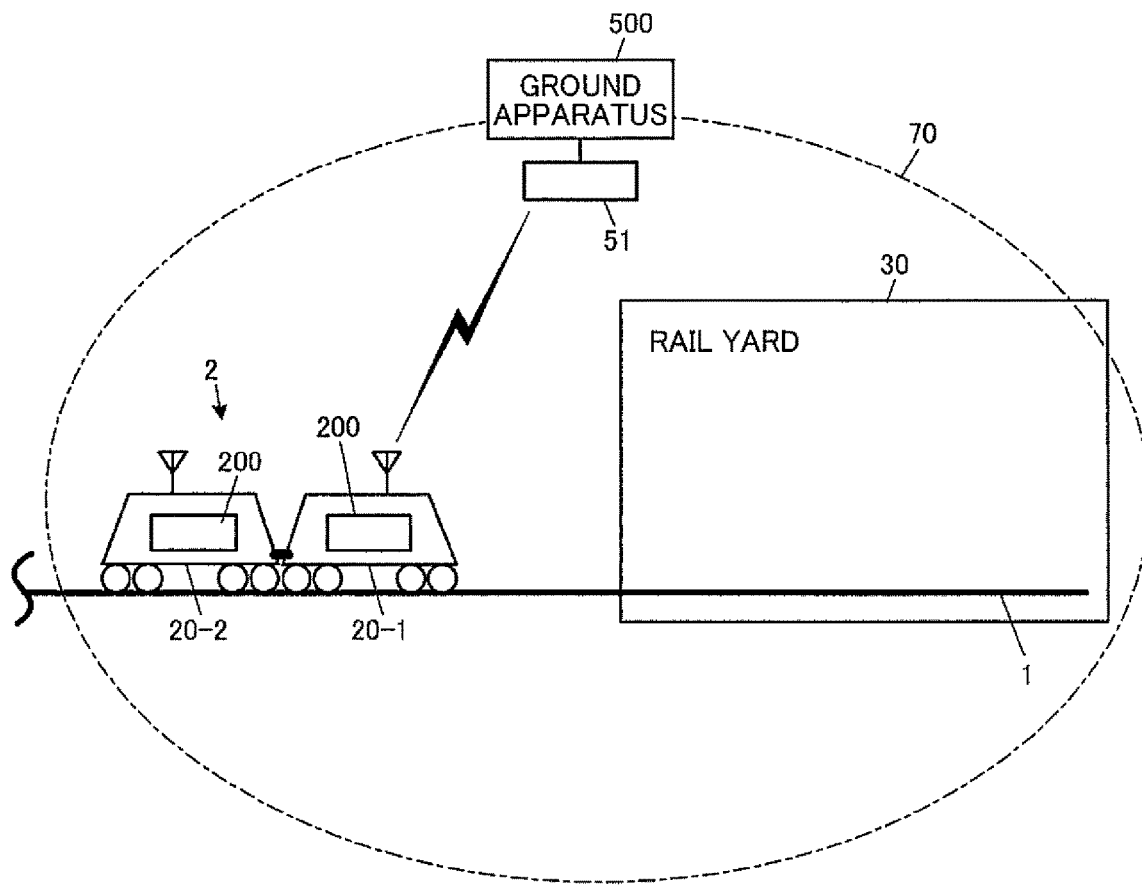
FIG. 1 is a diagram illustrating a general configuration example of an on-rail train management system.

According to the embodiments of the present invention, it is possible to manage the entering and leaving of trains into and from the building of the rail yard, and to realize a secure and safe train management.

According to one embodiment of the invention, there is provided an on-rail train management system comprising an on-board apparatus and a ground apparatus, wherein wireless communication between the on-board apparatus and the ground apparatus being impossible or difficult when a train enters a building of a rail yard, but possible in commercial operation, the train being formed by one or more vehicle-formation-sets, the on-board apparatus being mounted on each of the vehicle-formation-sets, and executing storing IDs of the vehicle-formation-sets, transmitting train information including the IDs of the vehicle-formation-sets to the ground apparatus in response to an inquiry from the ground apparatus, and performing a predetermined emergency stop control when determining that there is not the inquiry from the ground apparatus after leaving the building, and the ground apparatus executing, when there is the train entering the building, storing the IDs of the respective vehicle-formation-sets of the train in an entering order by a FILO (First-In-Last-Out) method, when there is the train leaving the building, sequentially reading the IDs by the FILO method, performing the inquiry based on the IDs in the order of the reading to obtain the train information from the on-board apparatus of each of the vehicle-formation-sets forming the train, and performing a predetermined alarm output control when the on-board apparatus does not respond to the inquiry, and obtaining of the train information fails.

According to another embodiment of the invention, there is provided a ground apparatus of an on-rail train management system comprising an on-board apparatus and the ground apparatus, wireless communication between the on-board apparatus and the ground apparatus being impossible or difficult when a train enters a building of a rail yard, but possible in commercial operation, the train being formed by one or more vehicle-formation-sets, the on-board apparatus being mounted on each of the vehicle-formation-sets, and executing storing IDs of the vehicle-formation-sets, transmitting train information including the IDs of the vehicle-formation-sets to the ground apparatus in response to an inquiry from the ground apparatus, and performing a predetermined emergency stop control when determining that there is not the inquiry from the ground apparatus after leaving the building, when there is the train entering the building, storing the IDs of the respective vehicle-formation-sets of the train in an entering order by a FILO (First-In-Last-Out) method, when there is the train leaving the building, sequentially reading the IDs by the FILO method, performing the inquiry based on the IDs in the order of the reading to obtain the train information from the on-board apparatus of each of the vehicle-formation-sets forming the train, and performing a predetermined alarm output control when the on-board apparatus does not respond to the inquiry, and obtaining of the train information fails.

According to another embodiment of the invention, there is provided a train management method in an on-rail train management system comprising an on-board apparatus and a ground apparatus, wireless communication between the on-board apparatus and the ground apparatus being impossible or difficult when a train enters a building of a rail yard, but possible in commercial operation, the train being formed by one or more vehicle-formation-sets, the on-board apparatus being mounted on each of the vehicle-formation-sets, and storing IDs of the vehicle-formation-sets, the train management method comprising:

transmitting, by the on-board apparatus, train information including the IDs of the vehicle-formation-sets to the ground apparatus in response to an inquiry from the ground apparatus, when there is the train entering the building, storing, by the ground apparatus, the IDs of the respective vehicle-formation-sets of the train in an entering order by a FILO (First-In-Last-Out) method, when there is the train leaving the building, sequentially reading, by the ground apparatus, the IDs by the FILO method, performing the inquiry based on the IDs in the order of the reading to obtain the train information from the on-board apparatus of each of the vehicle-formation-sets forming the train, performing, by the ground apparatus, a predetermined alarm output control when the on-board apparatus does not respond to the inquiry, and obtaining of the train information fails, and performing, by the on-board apparatus, a predetermined emergency stop control when determining that there is not the inquiry from the ground apparatus after leaving the building.

According to these embodiments, the ground apparatus can manage, by the entering order of vehicle-formation-sets forming the train, the entering of the train into the building of the rail yard where wireless communication with the on-board apparatus becomes impossible or difficult. On the other hand, when the train leaves the building, the ground apparatus can inquire the vehicle-formation-sets in the reverse order of the entering order, and determine whether or not the leaving is proper depending on whether or not there is a response to the inquiry (whether or not the train information is successfully obtained). Then, when the leaving is not proper, alarm output control can be performed. According to this, it is possible to correctly determine whether or not the leaving is proper, even when the train leaves with a configuration of vehicle-formation-sets different from that at the time of entering, due to coupling to other vehicle-formation-sets or division of the vehicle-formation-sets in the building. On the other hand, the on-board apparatus can perform emergency stop control when there is no inquiry from the ground apparatus despite the leaving from the building. Accordingly, it is possible to manage the entering and leaving of the train into and from the building of the rail yard for each vehicle-formation-set, and to securely and safely perform the train management.

In the on-rail train management system, wherein, at the time of the commercial operation, out of the most inbound-side vehicle-formation-set forming the train and the most outbound-side vehicle-formation-set forming the train, the on-board apparatus of either one of the vehicle-formation-sets may be defined as a parent apparatus, and the parent apparatus may notify the ground apparatus of the ID of each of the vehicle-formation-sets forming the train, in association with a coupling order of the vehicle-formation-sets, included in the train information together with position information of the train.

According to this embodiment, when the train properly leaves the building, the on-board apparatus of either one of the most inbound-side vehicle-formation-set and the most outbound-side vehicle-formation-set forming the train is used as a parent apparatus, and the parent apparatus can perform wireless communication with the ground apparatus as the representative. According to this, a single on-board apparatus per train can perform wireless communication with the ground apparatus in accordance with the configuration of vehicle-formation-sets at the time of leaving from the building, and can transmit and receive data required for the subsequent commercial operation of the train.

Hereinafter, referring to the drawings, preferred embodiments of the invention will be described. Note that the invention is not limited by the embodiments described below, and the forms in which the invention can be applied are not limited to the following embodiments. Additionally, the same reference signs are assigned to the identical parts in the description of the drawings. Further, though a vehicle-formation-set is illustrated as one vehicle in order to facilitate understanding, the number of vehicles of the vehicle-formation-set may be any number, and each vehicle-formation-set may have a different number of vehicles.

FIG. 1 is a diagram illustrating a general configuration example of an on-rail train management system in this embodiment. As illustrated in FIG. 1, the on-rail train management system includes an on-board apparatus 200 mounted on a train 2 that travels on a track 1, and a ground apparatus 500 that performs wireless communication with the on-board apparatus 200. In FIG. 1, it is assumed that the left-hand direction is the inbound side (the starting point side of the track 1), and the right-hand direction is the outbound side.

The on-board apparatus 200 is mounted on each of vehicle-formation-sets 20 (20-1, 2) forming the train 2. Here, the train 2 traveling on the track 1 includes a train (vehicle-formation-set train) formed by one vehicle-formation-set, and a train (multiple-section operation train) that performs a multiple-section operation by coupling a plurality of vehicle-formation-sets to each other. A unique ID (vehicle-formation-set ID) is assigned to each vehicle-formation-set, and in the case of a vehicle-formation-set train, the vehicle-formation-set ID of the vehicle-formation-set is used as a train ID. On the other hand, in the case of a multiple-section operation train, among the vehicle-formation-sets forming the multiple-section operation train, the vehicle-formation-set ID of a vehicle-formation-set on which a predetermined on-board apparatus 200, which is used as a parent apparatus, is mounted is used as the train ID. Specifically, out of the most inbound-side vehicle-formation-set and the most outbound-side vehicle-formation-set that are forming the train 2, the on-board apparatus 200 of the vehicle-formation-set closer to the track end of the rail yard 30 is used as the parent apparatus. In the example of FIG. 1, for simplicity, it is assumed that the vehicle-formation-set is formed by one vehicle, and the train 2 is a multiple-section operation train in which two vehicle-formation-sets 20-1, 2 are coupled to each other. In FIG. 1, out of the vehicle-formation-sets 20-1, 2 of the train 2, the on-board apparatus 200 of the vehicle-formation-set 20-1, which is closer to the track end of the rail yard 30, is used as the parent apparatus 200. Hereinafter, among the vehicle-formation-sets forming a multiple-section operation train, the vehicle-formation-set on which the parent apparatus is mounted is properly called "the parent vehicle-formation-set", and the other vehicle-formation-sets are properly called "the children vehicle-formation-sets."

The ground apparatus 500 is provided with a wireless base station 51, and is installed such that the whole area of the rail yard 30 route is within a wireless communication control area 70. Note that the number of wireless base stations 51 provided for the ground apparatus 500 is not limited to one, and may be two or more. A control section that is managed by one ground apparatus 500 should be covered by the wireless communication control area 70 of X (X≥1) wireless base station(s) 51 provided for the ground apparatus 500. Additionally, the wireless communication control area 70 may be formed not only by installing the wireless base station 51, but also by using a loop antenna or a leakage coaxial cable (LCX) that is installed along the track 1.

In the on-rail train management system of this embodiment, the ground apparatus 500, which is a primary station, performs wireless communication with the train 2 (in fact, the on-board apparatus 200), which is a secondary station, by the polling method (polling communication). The polling communication is the wireless communication in which the primary station queries all of the secondary stations in a sequential order by using a list of secondary stations (polling list), and transmits and receives necessary data (transmission data) when the secondary stations respond to the inquiry.

In this embodiment, the management target of the ground apparatus 500 is the train 2 capable of performing the polling communication, i.e., the train 2 that exists in the wireless communication control area 70 of the ground apparatus 500, and the ground apparatus 500 maintains a train list to which the train ID of the train 2, which is the management target, is set. When there is the train 2 coming in the wireless communication control area 70 so as to move into the rail yard 30, the train ID of the train 2 is set to the train list, and when the train 2 that has moved out from the rail yard 30 goes out from the wireless communication control area 70, the train ID of the train 2 is deleted from the train list. Then, the ground apparatus 500 transmits ground information including traveling control information D13 (see FIG. 2) to the on-board apparatus 200 by the polling communication using the train list as the polling list.

On the other hand, upon reception of the ground information addressed to the train from the ground apparatus 500, the on-board apparatus 200 replies train information including the train ID, train position information, etc., of the train. In detail, in the cases of a vehicle-formation-set train and a multiple-section operation train, the on-board apparatus 200 of the vehicle-formation-set and the parent apparatus 200, respectively, receive the ground information addressed to the vehicle-formation-set ID (own vehicle-formation-set ID) of the own vehicle-formation-set, which is used as the train ID, assuming the information is addressed to the train, and replies the train information. Accordingly, as illustrated in FIG. 1, when the train 2 is a multiple-section operation train, except at the time of leaving from the building 40 (see FIG. 4) described later, basically, the parent apparatus (the on-board apparatus of the parent vehicle-formation-set 20-1 in the case of FIG. 1) 200 performs the polling communication with the ground apparatus 500 as the representative. Additionally, in this embodiment, the traveling position of the own vehicle-formation-set measured by the on-board apparatus (the parent apparatus in the case of a multiple-section operation train) 200 is used as the traveling position (train position information) of the train.

Here, as illustrated in FIG. 1, the on-rail train management system of this embodiment is realized by performing wireless communication between the ground apparatus 500 including the rail yard 30 within its wireless communication control area 70 and the on-board apparatus 200. However, in fact, a plurality of ground apparatuses are installed along the track 1 such that the whole area of the track 1 including a commercial service line is within the wireless communication control area of any of the wireless base stations. Then, the on-board apparatus 200 performs the polling communication with an administrative ground apparatus, i.e., the ground apparatus (hereinafter also properly referred to as "the counterpart ground apparatus") including the traveling position of the train in the wireless communication control area so as to transmit the train information, and performs traveling control of the train related to commercial operation based on the traveling control information D13 received from the counterpart ground apparatus.

This polling communication is performed repeatedly in predetermined inquiry period. When the ground apparatus 500 can obtain the train information, the ground apparatus 500 can confirm the existence of the train 2 related to the train information, and can identify the position of the train 2 by train position information D23 (see FIG. 3) thereof. The inquiry period may be every second or may be every 5 seconds, for example, and is properly set.

Figure 2:
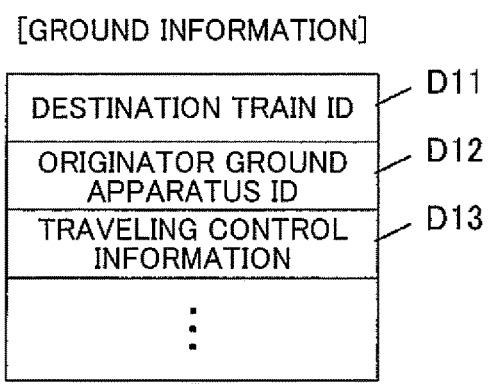
FIG. 2 is a diagram illustrating a format example of ground information.
Figure 3:
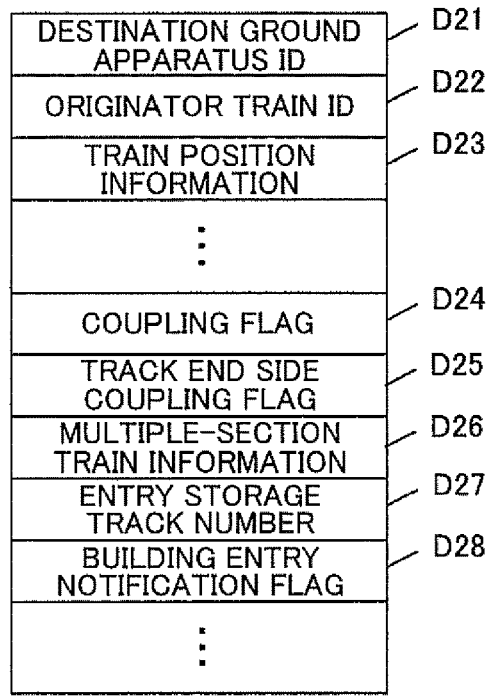
FIG. 3 is a diagram illustrating a format example of train information.

FIG. 2 is a diagram illustrating a format example of the ground information, and FIG. 3 is a diagram illustrating a format example of the train information. As illustrated in FIG. 2, the ground information includes a destination train ID D11 of the ground information, a originator ground apparatus ID D12 of the ground information, the traveling control information D13, which is the transmission data, etc. Various kinds of operation command information for the train 2 of the destination train ID D11, a coming-in range (coming-in allowable range) on the track 1 allowed for the train 2, etc. are set to the traveling control information D13.

On the other hand, as illustrated in FIG. 3, the train information includes a destination ground apparatus ID D21 of the train information, a originator train ID D22 of the train information, the train position information (position information) D23, which is the transmission data, a coupling flag D24, a track end side coupling flag D25, a multiple-section train information D26, an entry storage track number D27, a building entry notification flag D28, etc.

The ground apparatus ID assigned to the ground apparatus 500 is set to the destination ground apparatus ID D21.

The originator train ID D22 is the information of the vehicle-formation-set ID used as the train ID of the train 2 related to the train information, and an own vehicle-formation-set ID 222 stored in an on-board memory unit 22 (see FIG. 10) in the on-board apparatus (the parent apparatus in the case of a multiple-section operation train) 200 that transmitted the train information is set.

The train position information D23 is the information of the traveling position measured by the on-board apparatus (the parent apparatus in the case of a multiple-section operation train) 200 in the train 2 related to the train information.

When the train 2 related to the train information is a multiple-section operation train, "ON" is set to the coupling flag D24, and when the train 2 related to the train information is a vehicle-formation-set train, "OFF" is set to the coupling flag D24.

When, at the side closer to the track end of the rail yard 30, another vehicle-formation-set is coupled to the vehicle-formation-set on which the on-board apparatus 200 that transmitted the train information is mounted, "ON" is set to the track end side coupling flag D25. Otherwise, "OFF" is set.

Here, the on-board apparatus 200 can perform coupling detection of other vehicle-formation-sets to the own vehicle-formation-set whenever necessary. That is, the coupling to other vehicle-formation-sets is performed via a coupler 29 (see FIG. 10) provided in the inbound-side end vehicle or the outbound-side end vehicle of the own vehicle-formation-set, and when the coupling is completed, a coupling signal is output from the coupler 29 to the on-board apparatus 200. On the contrary, when the coupled vehicle-formation-sets are separated, the input of the coupling signal is interrupted.

When the coupling signal is input, the on-board apparatus 200 turns the coupling flag D24 "ON", and when the coupling signal is not input, the on-board apparatus 200 turns the coupling flag D24 "OFF". Then, when the coupling signal is input from the end vehicle closer to the track end of the rail yard 30, the track end side coupling flag D25 is turned "ON", and when the coupling signal is not input, the track end side coupling flag D25 is turned "OFF".

The multiple-section train information D26 is set when the train 2 related to the train information is a multiple-section operation train (when the coupling flag D24 is "ON"), and indicates the coupling order by arranging the vehicle-formation-set IDs of children vehicle-formation-sets in the order of coupling to a parent vehicle-formation-set (the order closer to the parent vehicle-formation-set). In the below illustrated case of the multiple-section operation train in which two vehicle-formation-sets are coupled to each other, there is one child vehicle-formation-set, and thus the vehicle-formation-set ID of the child vehicle-formation-set is set to the multiple-section train information D26. On the other hand, in the case of a multiple-section operation train in which three or more vehicle-formation-sets are coupled, the vehicle-formation-set IDs of two or more children vehicle-formation-sets are arranged in the order of coupling to the parent vehicle-formation-set, and are set to the multiple-section train information D26. For example, in the case of a multiple-section operation train in which a child vehicle-formation-set having the vehicle-formation-set ID "54" is coupled to a parent vehicle-formation-set having the vehicle-formation-set ID "22", and a child vehicle-formation-set having the vehicle-formation-set ID "58" is coupled to the above-mentioned child vehicle-formation-set, the multiple-section train information D26 is set to be "54, 58".

The entry storage track number D27 indicates a storage track 50 (see FIG. 4) on which the train 2 related to the train information is going to travel or exists, and a storage track number obtained from a balise 63 described later is set to the entry storage track number D27, before the train 2 enters the building 40.

The building entry notification flag D28 is the information for notifying the ground apparatus 500 of the entry into the building 40, and "ON" is set to the building entry notification flag D28 at the timing when the storage track number is obtained from balise 63, for example.

Note that, in addition to the illustrated data, necessary data, such as a transmission time, a CRC (Cyclic Redundancy Checking) code for error detection, etc., is properly set to the ground information and the train information. The data to be included in the ground information and the train information as the transmission data is also properly set. For example, the train information can properly include the information of the travel speed, train length, and train occupancy range of the train 2, etc.

Principle

Figure 4:
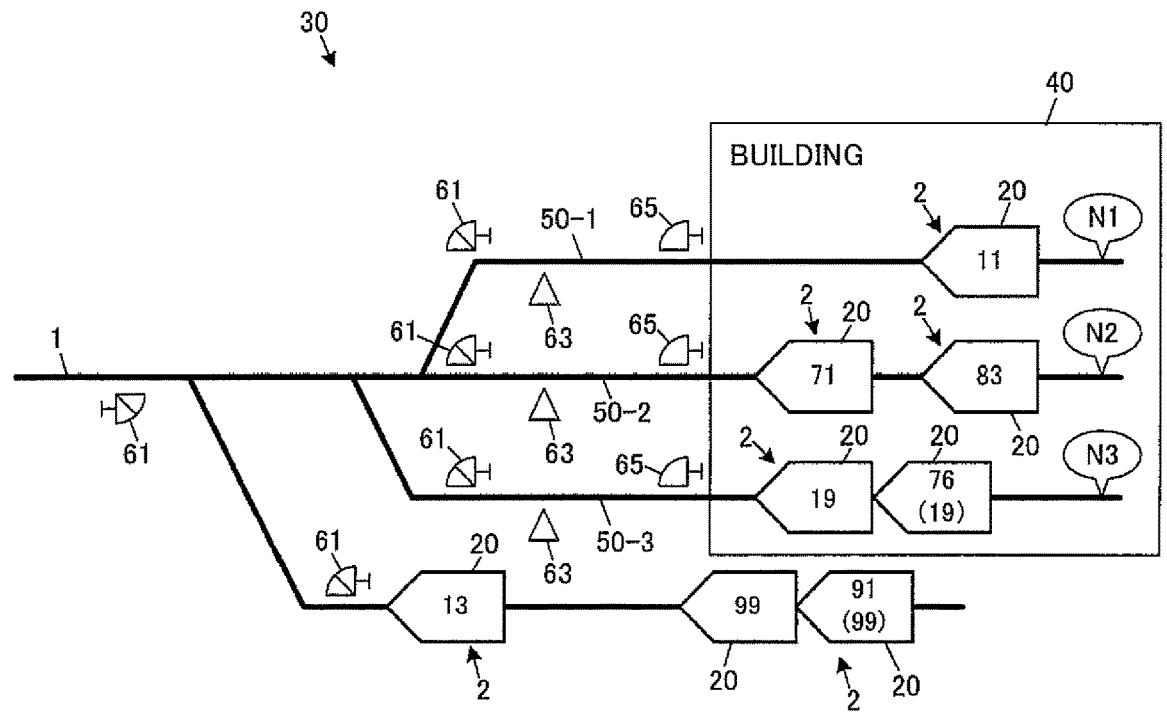
FIG. 4 is a diagram schematically illustrating a rail yard.

FIG. 4 is a diagram schematically illustrating the rail yard 30. The train 2 moves into the rail yard 30 whenever necessary so that vehicles are housed and subjected to inspection, etc., or the formation operation of trains such as coupling or division of the vehicles is performed, etc., and the train 2 is parked in the building 40. Therefore, a plurality of (three in FIG. 4, i.e., the storage track number=N1, N2, N3) storage tracks are installed within the rail yard 30 for guiding the train 2 that has moved into the rail yard 30 into the building 40. Here, the number of vehicle-formation-sets 20 that can be parked in each of the storage tracks 50 (50-1, 2, 3) is determined in advance based on the length of the storage track 50 (or the area of the building 40) and the length of a vehicle-formation-set (vehicle-formation-set length). In this embodiment, for simplicity of description, it is assumed that the vehicle-formation-set length is fixed, and the number of vehicle-formation-sets 20 that can be parked in each storage track 50 is two. However, the processing is the same even when the number of the vehicle-formation-sets that can be parked is three or more. Additionally, the vehicle-formation-set length may be variable, and in this case, the train 2 having a length that can be parked may be selectively allowed to enter, based on the number of vehicle-formation-sets, each vehicle-formation-set length, etc., of the train 2 that is already parked.

Here, among the numbers assigned to the vehicle-formation-sets 20 in FIG. 4, the numbers without parentheses indicate their vehicle-formation-set IDs, and the numbers with parentheses indicate the contents of the multiple-section train information D26 maintained in the parent apparatus. For example, in the case of the train 2 in the storage track 50-3, which is a multiple-section operation train, the vehicle-formation-set 20 closer to the track end (closer to the right-end side of FIG. 4) to which the number with a parenthesis is assigned is the parent vehicle-formation-set, and the vehicle-formation-set ID "76" of the vehicle-formation-set 20 is also used as the train ID as described above.

At the branching portions of the track 1 that are used as the entrances/exits of the respective storage tracks 50, a shunting signal 61 and the balise 63 are installed for each of the storage tracks 50. Additionally, a shunting indicator 65 is installed for each of the storage tracks 50 near the entrance/exit of the building 40.

The shunting signal 61 indicates the proceed/stop of the train 2 to the commercial service line beyond a branching point from the storage track 50 side. Note that this shunting signal 61 is installed in a proper place besides the branching portions.

The balise 63 maintains a corresponding storage track number, a predetermined installed position (absolute position) of the balise 63, etc., in order to transmit these to the train 2 entering and exiting the relevant storage track 50. The on-board apparatus (the parent apparatus in the case of a multiple-section operation train) 200 of the train 2 entering the building 40 performs near field communication with the balise 63 when passing through a position in the vicinity of the balise 63, and obtains the storage track number to be traveled from the balise 63. Additionally, the installed position of the balise 63 is also obtained, and is used for properly correcting the traveling position of the train. When the train 2 leaves the building 40 and exceeds the branching point, the position correction is properly performed in a similar manner.

The shunting indicator 65 displays whether leaving from the building 40 is allowed/not allowed for the train 2 parked in the relevant storage track 50 in the building 40. Except the time when the train 2 leaves the building 40 described later, the display of the shunting indicator 65 is set to "not allowed."

When the train 2 enters the building 40, the wireless communication between the on-board apparatus 200 and the ground apparatus 500 becomes impossible or difficult. It is because the wireless base station 51 of the ground apparatus 500 is installed outside the building 40, and it is impossible or difficult for electric waves to reach the wireless base stations 51 from inside of the building 40. Additionally, there is a case where the vehicle's power of the train 2 may be cut off for inspection, etc., in the building 40, and, needless to say, communication may become impossible in that case. Hereinafter, it is assumed that the wireless communication between the ground apparatus 500 and the on-board apparatus 200 in the building 40 is impossible.

Figure 5:
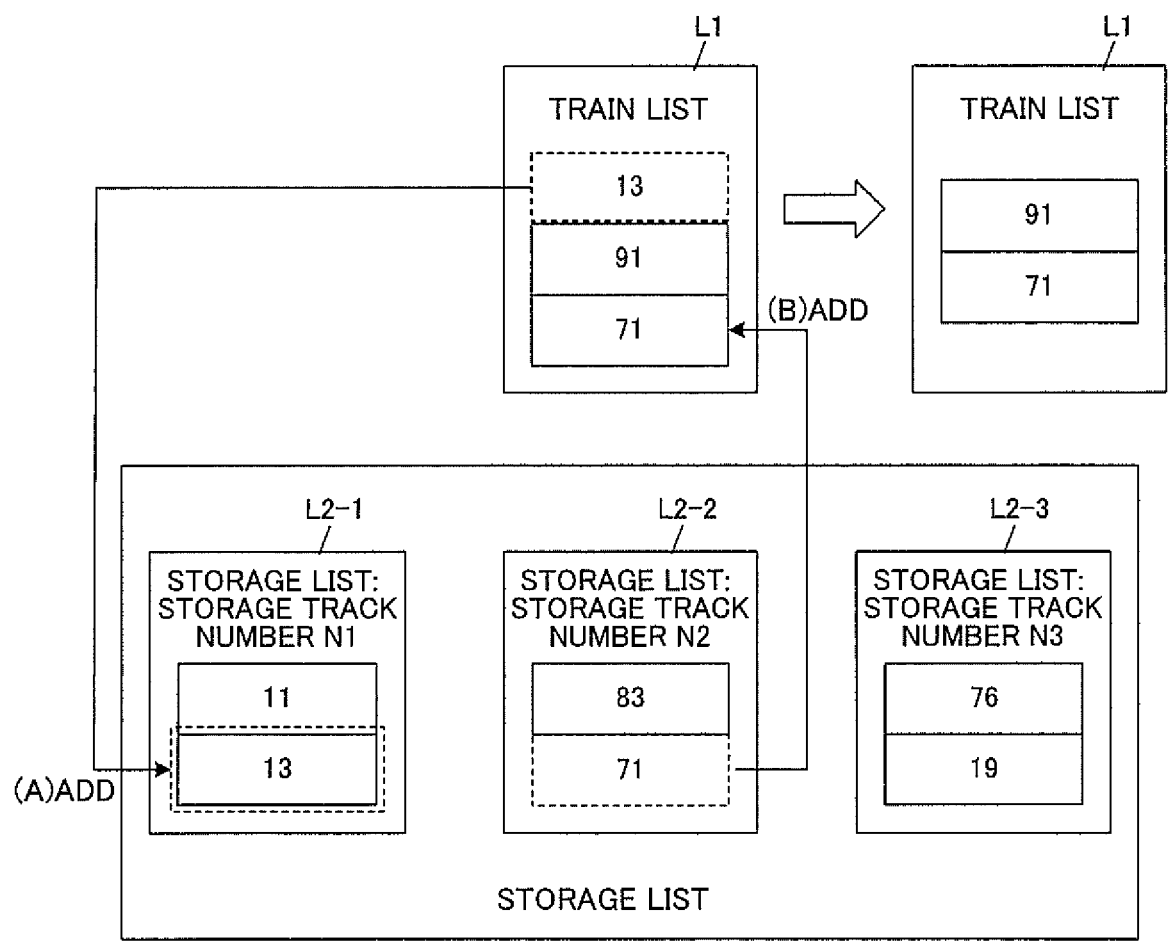
FIG. 5 is a diagram explaining the outline of entering and leaving management of a train into and from a building.

Therefore, the ground apparatus 500 manages the entering and leaving of the train 2 into and from the building 40. FIG. 5 is a diagram explaining the outline of entering and leaving management of the train 2 into and from the building 40. As illustrated in FIG. 5, the ground apparatus 500 maintains a storage list L2 (L2-1, 2, 3) for managing the entering and leaving of the train 2 into and from the building 40 for each of the storage tracks 50, in addition to a train list L1 to which the train ID of the management target train 2, which is the target for wireless communication (for performing the above-referenced polling communication), is set. Using this storage list L2, the ground apparatus 500 stores and manages the vehicle-formation-set IDs of the vehicle-formation-sets forming the train 2 entering the building 40 by the FILO (First-In-Last-Out) method in the entering order of the vehicle-formation-sets. Note that the train list L1 and the storage list L2 illustrated in FIG. 5 are based on the on-rail conditions in FIG. 4.

For example, it is assumed that the train (vehicle-formation-set train) 2 having the train ID (it is also the vehicle-formation-set ID) "13" entered the building 40 from the storage track 50-1 in FIG. 4. In this case, as illustrated in FIG. 5, "13" is added to the bottom of the storage list L2-1, and also, "13" is deleted from the train list L1 ((A) in FIG. 5). The reason for deleting "13" from the train list L1 is that wireless communication becomes impossible due to the entering of the train 2 having "13" into the building 40, and consequently, the ground apparatus 500 removes the train 2 having "13" from the management targets.

Additionally, when the train (vehicle-formation-set train) 2 having "71" in the storage track 50-2 leaves the building 40 at another timing, "71" is read from the bottom of the storage list L2-2, and "71" is set to the train list L1. Further, at that moment, "71" in the storage list L2-2 is deleted ((B) in FIG. 5).

It is described in detail. In this embodiment, two vehicle-formation-sets can be parked in each of the storage tracks 50. Therefore, there are three entering patterns for the train 2 to enter the building 40 in each of the storage tracks 50, i.e., the case where one vehicle-formation-set train enters as in the storage track 50-1 in FIG. 4, the case where two vehicle-formation-set trains enter as in the storage track 50-2, and the case where one multiple-section operation train formed by two vehicle-formation-sets 20 enters as in the storage track 50-3.

On the other hand, in the building 40, a dividing operation of a multiple-section operation train, and a coupling operation of vehicle-formation-set trains are properly conducted. Therefore, the leaving patterns for the train 2 from each of the storage tracks 50 include, in addition to the case where the train 2 leaves as the same vehicle-formation-set train at the time of entering in the storage track 50-1, the case where two trains 2 leave as the same vehicle-formation-set trains at the time of entering in the reverse order of the entering order in the storage track 50-2, and the case where the train 2 leaves as the same multiple-section operation train at the time of entering in the storage track 50-3, the case where each vehicle-formation-set train is coupled to each other, and leaves as a multiple-section operation train in the storage track 50-2, and the case where a multiple-section operation train is divided into two vehicle-formation-set trains, and leaves in the reverse order of the entering order of each of the relevant vehicle-formation-set in the storage track 50-3.

Figure 6:
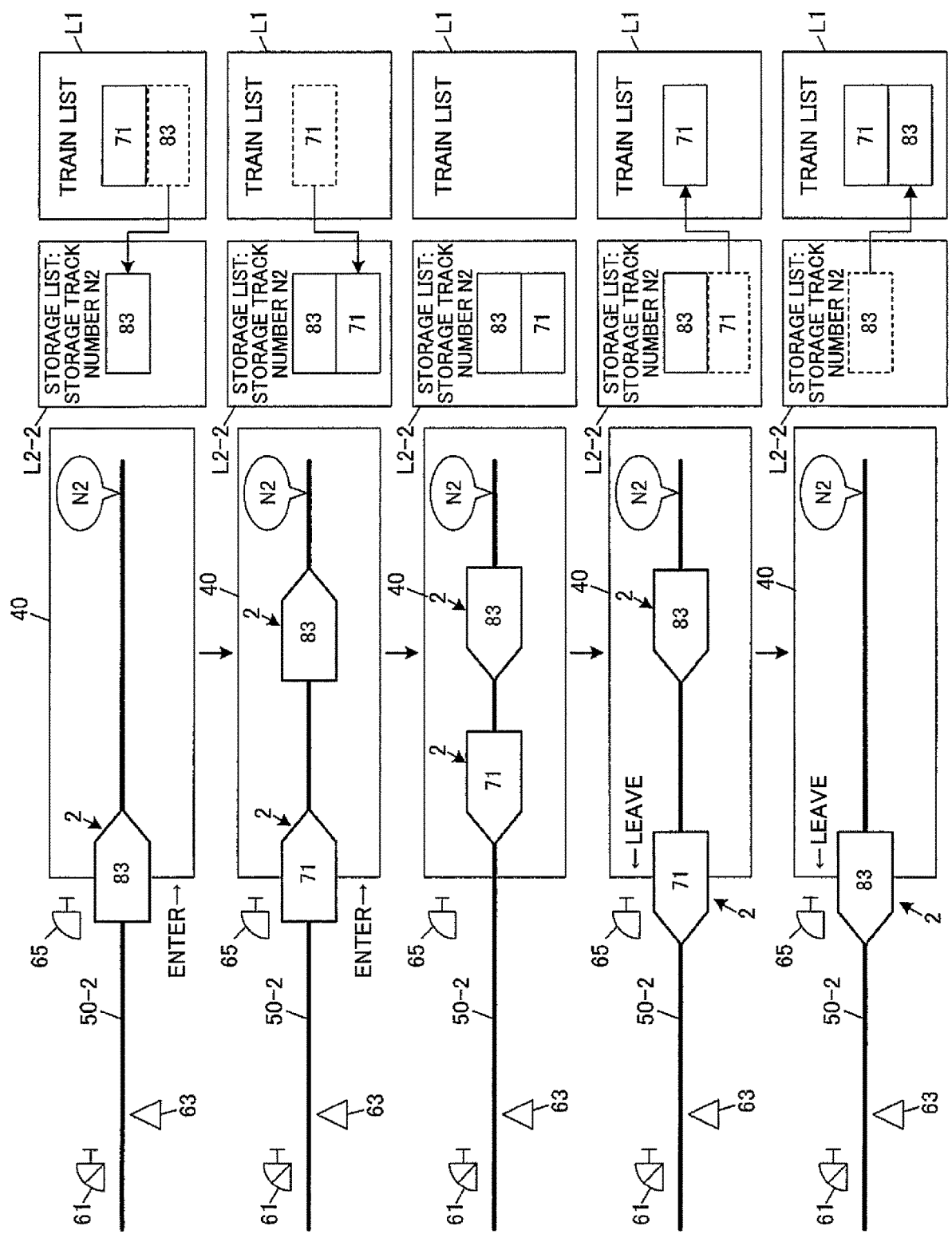
FIG. 6 is a diagram illustrating a detailed flow of the entering and leaving management.

First, referring to FIG. 6, a description is given of a detailed flow of the entering and leaving management in the case where the train 2, which is a vehicle-formation-set train, enters the building 40, and leaves as is without being coupled or divided in the building 40. As illustrated in the top stage in FIG. 6, it is assumed that the train 2 having "83" entered the building 40 from the storage track 50-2. When the building entry notification flag D28 of the train information having "83" as the originator train ID D22 is turned "ON", the ground apparatus 500 can identify the entering of the train 2 into the building 40. In this case, the ground apparatus 500 adds "83" to the storage list L2-2. When there is already a vehicle-formation-set ID set to the storage list L2-2, the addition is made to the bottom. Additionally, "83" is deleted from the train list L1.

Similarly, for the subsequent entering of the train 2 having "71", "71" is added to the bottom of the storage list L2-2, and "71" is deleted from the train list L1.

Next, a description is given of a procedure in which a train 2 leaves from the storage track 50-2 into which two trains 2 entered as described above (the third stage in FIG. 6). When an attendant inputs a train start operation specifying the storage track 50 (the storage track 50-2 in the example of FIG. 6) in the ground apparatus 500, the ground apparatus 500 controls the shunting indicator 65 of the storage track 50-2 specified by the train start operation after setting a route, so as to change the display of the shunting indicator 65 to "allowed to leave"

Then, the ground apparatus 500 reads and deletes "71" from the bottom of the storage list L2-2, and sets "71" to the train list L1, and adds the train 2 having "71" to the management targets for performing the polling communication (the fourth stage in FIG. 6). Accordingly, the ground apparatus 500 is enabled to transmit the ground information having "71" as the destination train ID D11 at the time of polling communication.

In the building 40, a crew of the train 2 (the train 2 having "71" in the example of FIG. 6) parked in the storage track 50-2 and closer to the entrance/exit of the building 40 confirms the display of the shunting indicator 65, and makes the train 2 start in response to the fact that the display became "allowed". Accordingly, the train 2 having "71" leaves the building 40.

When the train 2 leaves the building 40, the on-board apparatus 200 is enabled to receive the ground information transmitted from the ground apparatus 500 as described above. Then, when the ground information is received, the train information is replied. Because the train 2 having "71" is a vehicle-formation-set train, the coupling flag D24 of the train information is "OFF." On the other hand, the ground apparatus 500 identifies the position of the train 2 having "71" by the train position information of the obtained train information. Thereafter, the train 2 stops in front of the shunting signal 61.

Incidentally, even when the ground apparatus 500 adds the train 2 having "71" to the management targets and starts transmitting the ground information, in the case where a certain abnormality occurs in the on-board apparatus 200 of the train 2 having "71" and wireless communication is disabled (wireless communication abnormality), the ground apparatus 500 remains unable to obtain the train information. On the contrary, when the ground apparatus 500 side is experiencing the wireless communication abnormality, the on-board apparatus 200 of the train 2 having "71" remains unable to receive the ground information, even when the on-board apparatus 200 comes out of the building 40. Thus, when the train 2 having "71" does not respond to an inquiry even when a predetermined time has passed since the train 2 is set to the management target in response to the input of the train start operation, and a normal communication is not made, i.e., when the ground apparatus 500 failed to obtain the train information, the ground apparatus 500 performs a predetermined alarm output control, indicating that the leaving is not proper. On the other hand, the on-board apparatus 200 side determines that there is no inquiry from the ground apparatus 500, and performs a predetermined emergency stop control, when there is no polling communication with the ground apparatus 500 until passing the balise 63 after leaving the building 40.

Additionally, when the wireless communication is not normally performed between the ground apparatus 500 and the train 2 that has left, there is the case where the leaving order of the train 2 from the building 40 is not proper, in addition to the case of the wireless communication abnormality. For example, there are cases where, though the trains 2 entered in the order illustrated in the first to second stages in FIG. 6, the train 2 having "83" leaves and the train 2 having "71" does not leave, and where another train 2, which is neither "71" nor "83", leaves. In this embodiment, the ground apparatus 500 reads the vehicle-formation-set ID from the bottom of the storage list L2-2, and adds this to the train list L1 as the train ID, thereby performing the transmission of the ground information to the relevant train 2. Therefore, when the train 2 leaves in the order that does not follow the reverse order of the entering order, the on-board apparatus 200 of the train 2 that has left cannot receive the ground information, and it is impossible to reply train information. Accordingly, because the polling communication is not normally performed as in the case of the wireless communication abnormality, the ground apparatus 500 performs the alarm output control indicating that the leaving is not proper, as in the case of the wireless communication abnormality. Additionally, the on-board apparatus 200 determines that there is no inquiry from the ground apparatus 500, and performs the emergency stop control.

In this way, when the vehicle-formation-set train enters the building 40 and leaves as the same vehicle-formation-set train, in the case where the leaving order follows the reverse order of the entering order, and the polling communication is normally performed at the time of leaving, it is allowed that the train2 runs into the commercial service line at the timing when the subsequent indication of the shunting signal 61 becomes "proceed signal". When the polling communication is not normally performed, the indication of the shunting signal 61 remains "stop signal", and it is not allowed that the train2 runs into the commercial service line.

Figure 7:
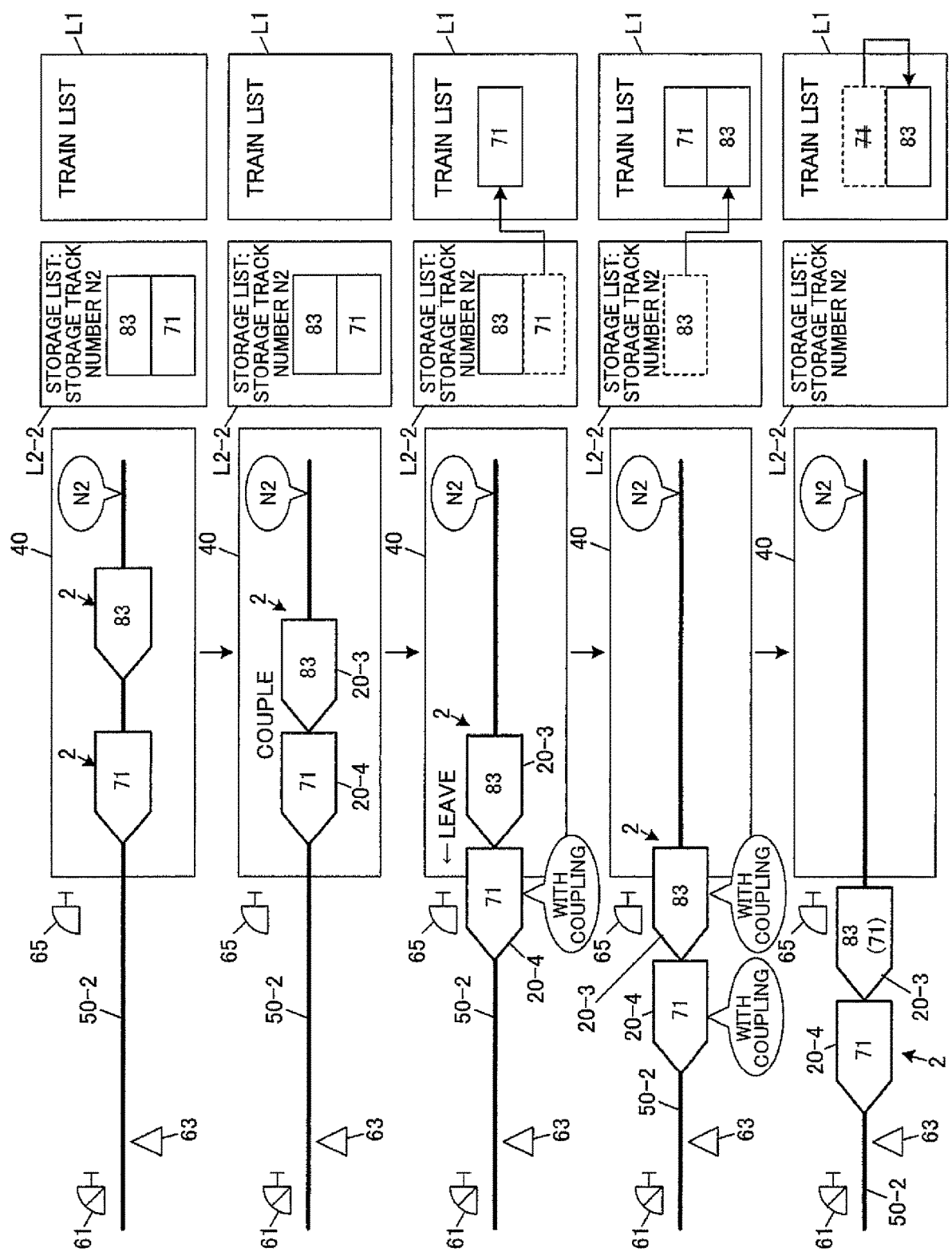
FIG. 7 is another diagram illustrating a detailed flow of the entering and leaving management.

Next, referring to FIG. 7, a description is given of a detailed flow of the entering and leaving management in the case where two vehicle-formation-set trains leave after being coupled to each other in the building 40. The procedure at the time of entering is the same as that in FIG. 6. In the example of FIG. 7, two trains 2 that entered from the storage track 50-2 are subjected to a coupling operation in the building 40 to form a multiple-section operation train (the first to second stages).

Then, at the time of the leaving, the procedure is basically the same as that in the case of FIG. 6. The ground apparatus 500 changes the display of the shunting indicator 65 to "allowed to leave" in accordance with the train start operation with respect to the storage track 50-2, reads and deletes "71" from the bottom of the storage list L2-2, and sets "71" to the train list L1 (the third stage in FIG. 7).

On the other hand, from the building 40, the train (multiple-section operation train) 2 leaves. A vehicle-formation-set 20-4 comes out of the building 40 first, and the on-board apparatus 200 of the vehicle-formation-set 20-4 is enabled to receive the ground information transmitted from the ground apparatus 500 as described above. Upon reception of the ground information, the on-board apparatus 200 of the vehicle-formation-set 20-4 replies the train information. Because the train 2 having "71" is a multiple-section operation train, the coupling flag D24 of the replied train information is "ON."

Here, when the train information whose coupling flag D24 is "ON" is obtained, the track end side coupling flag D25 is referred to. Then, when the track end side coupling flag D25 is "ON", the ground apparatus 500 performs reading and deleting on the storage list L2-2 and setting of the train list L1 again. Here, "83" is read and deleted from the bottom of the storage list L2-2, and "83" is set to the train list L1 (the fourth stage in FIG. 7). Then, when the train 2 further continues traveling, and consequently, the on-board apparatus 200 of a vehicle-formation-set 20-3 comes out of the building 40, the on-board apparatus 200 receives the ground information, and replies the train information.

Note that as a result, the coupling flag D24 of the train information obtained by the ground apparatus 500 from the on-board apparatus 200 of the vehicle-formation-set 20-3 is "ON". However, the track end side coupling flag D25 is "OFF." This is because, for the vehicle-formation-set 20-3, a vehicle-formation-set 20-4 is coupled to the opposite side of the closer-to-the-track-end side of the rail yard 30, and other vehicle-formation-sets are not coupled to the closer-to-the-track-end side of the rail yard 30. When the track end side coupling flag D25 is "OFF", it is determined that the entire train (multiple-section operation train) 2 has come out of the building 40, and the processing shifts to a subsequent stage. Note that when the track end side coupling flag D25 is "ON", the ground apparatus 500 further performs reading and deleting on the storage list L2-2 and setting of the train list L1.

Then, when the entire train 2 comes out of the building 40 as described above, and the ground apparatus 500 can obtain the train information from the on-board apparatuses 200 of all of the vehicle-formation-sets 20-3, 4, the ground apparatus 500 specify the parent apparatus. As described above, the parent apparatus is mounted on the parent vehicle-formation-set, and the vehicle-formation-set 20 (vehicle-formation-set 20-3 in FIG. 7) closer to the track end of the rail yard is the parent vehicle-formation-set. Accordingly, the parent apparatus always leaves the building 40 last when the train 2 leaves. In this embodiment, the ground apparatus 500 specifies the originator train ID of the train information whose aforementioned coupling flag D24 is "ON", but whose track end side coupling flag D25 is "OFF" as the originator train ID of a parent vehicle-formation-set, and uses the on-board apparatus 200 of the parent vehicle-formation-set as the parent apparatus.

When the parent apparatus 200 is specified, the ground apparatus 500 arranges, in the reverse order of the receiving order, the originator train IDs (indicating the vehicle-formation-set IDs of the children vehicle-formation-sets) of the train information received from the on-board apparatus 200 of the children vehicle-formation-sets before specifying the parent apparatus 200, and generates multiple-section train information. Then, the generated multiple-section train information is transmitted to the specified parent apparatus 200. Additionally, the vehicle-formation-set IDs of the children vehicle-formation-sets are deleted from the train list L1, and the train list L1 is updated by leaving only the vehicle-formation-set ID of the parent vehicle-formation-set (the fifth stage in FIG. 7).

Figure 8:
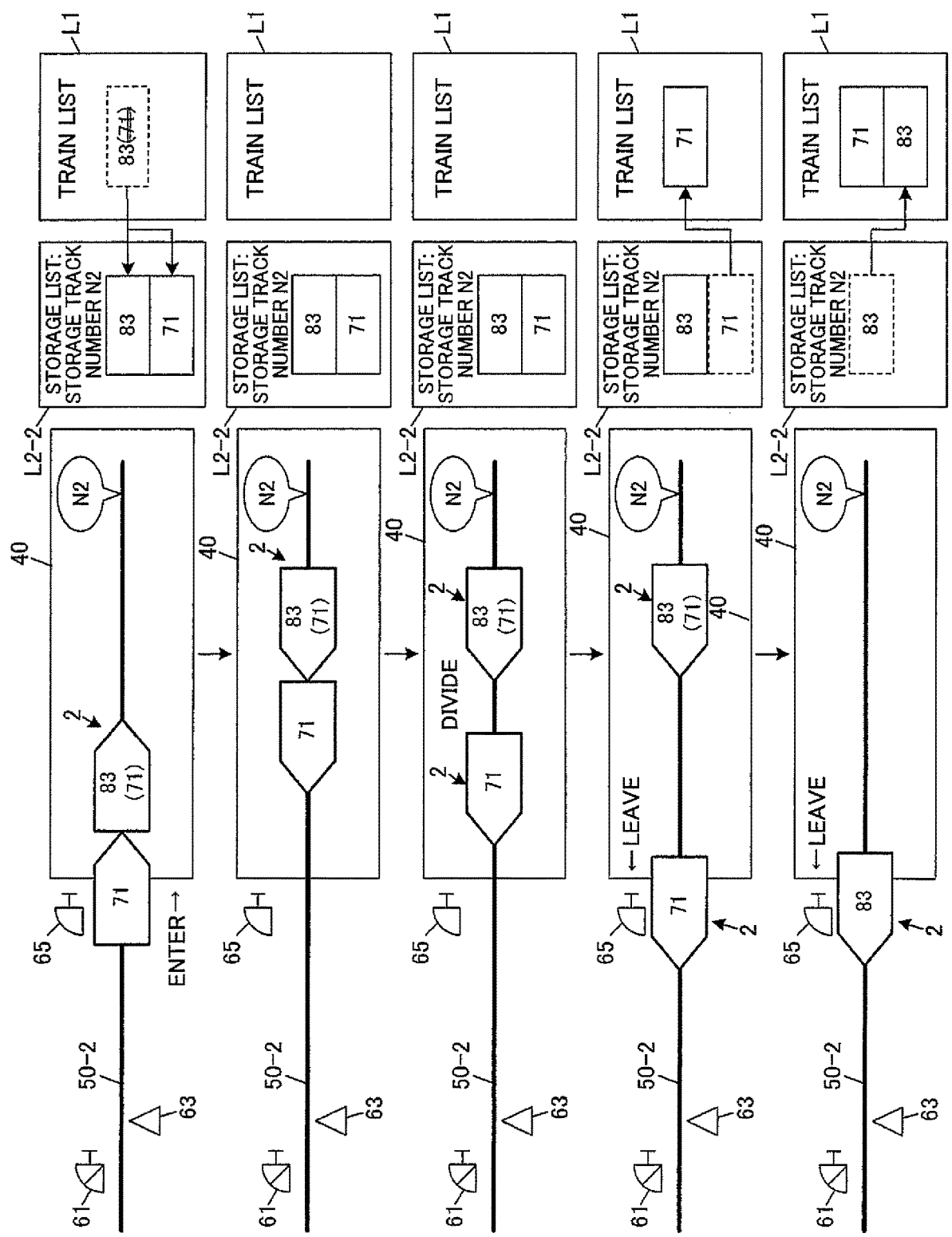
FIG. 8 is another diagram illustrating a detailed flow of the entering and leaving management.

Next, referring to FIG. 8, a description is given of a detailed flow of the entering and leaving management in the case where a multiple-section operation train is divided into two vehicle-formation-set trains in the building 40, and thereafter leaves. As illustrated in the top stage in FIG. 8, it is assumed that the train (multiple-section operation train) 2 having "83" entered the building 40 from the storage track 50-2. The entering of the train 2 can be identified by the building entry notification flag D28 of the train information whose originator train ID D22 is "83". Additionally, because its coupling flag D24 is "ON", the ground apparatus 500 can identify that the train 2 is a multiple-section operation train. In addition, the ground apparatus 500 can identify the vehicle-formation-set ID of a child vehicle-formation-set, and the coupling order to its parent vehicle-formation-set by the multiple-section train information D26.

In this case, the ground apparatus 500 adds "83" to the bottom of the storage list L2-2, and subsequently adds "71" of the multiple-section train information D26 to the storage list L2-2. Note that in the top stage in FIG. 8, in the train list L1, "71", which is not supposed to have been set, is written together with "83". However, this is for facilitating understanding, and "71" is not actually stored in the train list L1. When a plurality of vehicle-formation-set IDs are arranged and set to the multiple-section train information D26, each vehicle-formation-set ID is added to the bottom of the storage list L2-2 in that order. The procedure for each of the trains 2 to leave after being formed into vehicle-formation-set trains, as illustrated at the third stage in FIG. 8, by the dividing operation in the building 40 after entering is the same as that in FIG. 6.

According to the management of entering and leaving of the train 2 into and from the building 40 described above, when there is the train 2 entering the building 40, it is possible to park the entering order of vehicle-formation-sets for each storage track 50 to be traveled, irrespective of whether the train 2 is a vehicle-formation-set train or a multiple-section operation train. On the other hand, when there is the train 2 leaving the building 40, it is possible to correctly determine whether or not the leaving of the train 2 from the building 40 is proper by monitoring the leaving order of the vehicle-formation-sets of the train 2. Additionally, even when the coupling or division of vehicle-formation-sets is performed in the building 40, it is unnecessary to manually edit the storage list L2 and the train list L1, and also there is no worries about an erroneous input.

Functional Configuration
1. Ground Device

Figure 9:
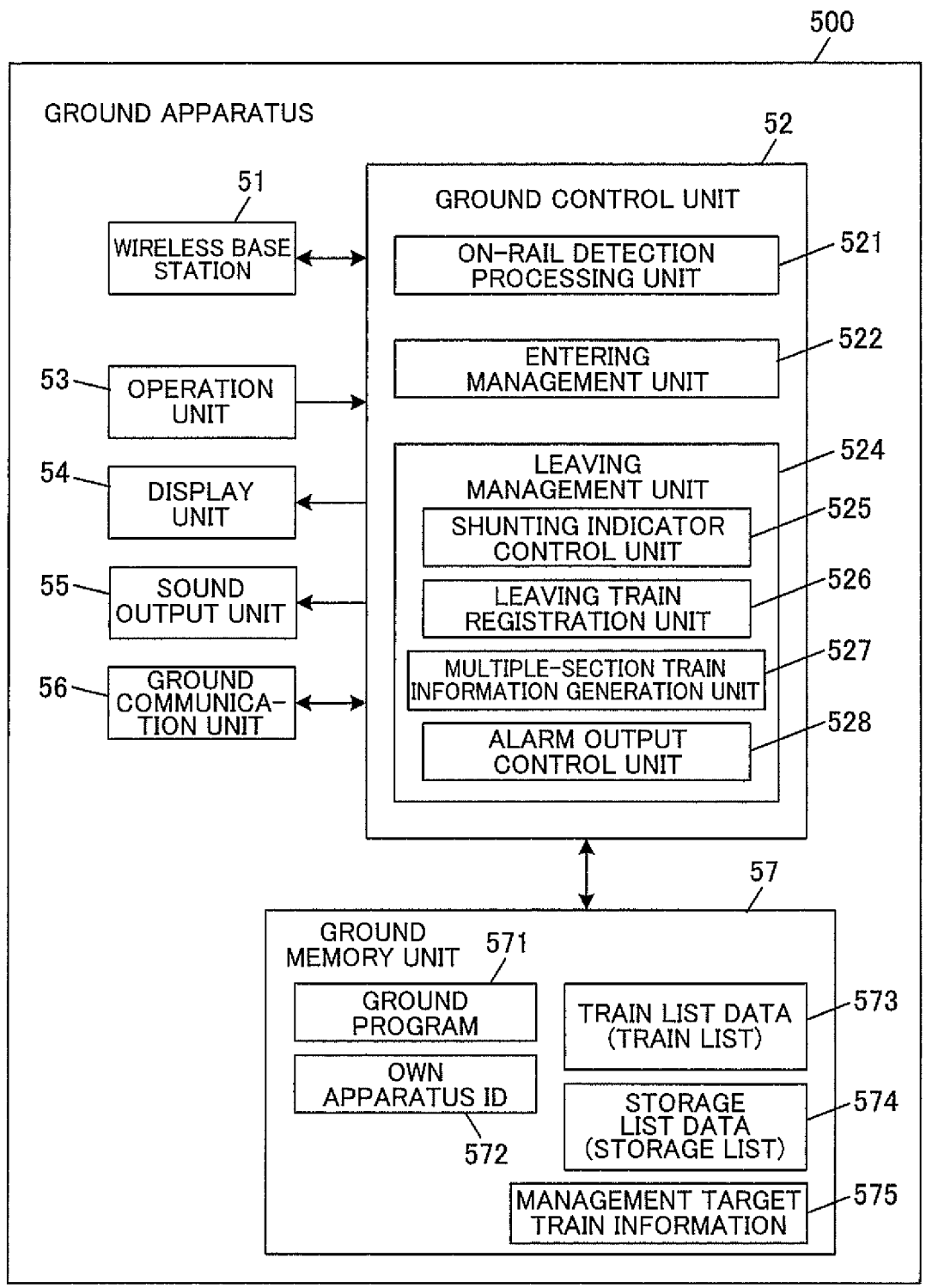
FIG. 9 is a block diagram illustrating a functional configuration example of a ground apparatus.

FIG. 9 is a block diagram illustrating a functional configuration example of the ground apparatus 500. As illustrated in FIG. 9, the ground apparatus 500 is a kind of computer control apparatus including a wireless base station 51 installed in a proper place in the neighborhood of the track 1, a ground control unit 52, an operation unit 53, a display unit 54, a sound output unit 55, a ground communication unit 56, and a ground memory unit 57.

The ground control unit 52 is formed by including an arithmetic apparatus or an arithmetic circuit, such as a CPU (Central Processing Unit) and a FPGA (Field Programmable Gate Array), and generally controls the operation of the ground apparatus 500 by giving instructions to and transferring data to each of the units forming the ground apparatus 500, based on the program and data stored in the ground memory unit 57, the data received from the on-board apparatus 200 (the train 2) and other ground apparatuses, etc. This ground control unit 52 includes an on-rail detection processing unit 521, an entering management unit 522, and a leaving management unit 524. Each of the function units that the ground control unit 52 includes may be realized by an individual arithmetic circuit, or may be individually realized by software-based arithmetic processing by the arithmetic circuit.

The on-rail detection processing unit 521 performs the polling communication with the management target train 2 in predetermined inquiry period using a train list 573, so as to detect the on-rail status (position) of the train 2.

The entering management unit 522 performs processing related to the entering management of the train 2 into the building 40. Specifically, when the train 2 enters the building 40, the vehicle-formation-set IDs of the vehicle-formation-sets forming the train 2 are added, in the entering order into the building 40, to the bottom of a storage list 574 of the storage track 50 to be traveled. Additionally, the added vehicle-formation-set IDs are deleted from the train list 573.

The leaving management unit 524 performs processing related to the leaving management of the train 2 from the building 40. This leaving management unit 524 includes a shunting indicator control unit 525, a leaving train registration unit 526, a multiple-section train information generation unit 527, and an alarm output control unit 528.

The shunting indicator control unit 525 controls the shunting indicator 65 installed for each storage track 50 near the entrance/exit of the building 40. In response to the train start operation that is input by the operation unit 53, this shunting indicator control unit 525 changes the display of the shunting indicator 65 of the storage track 50 specified by the train start operation to "allowed".

The leaving train registration unit 526 reads and deletes the vehicle-formation-set ID registered at the last of the storage list 574 of the storage track 50 specified by the train start operation, and sets the vehicle-formation-set ID to the train list 573. When the train 2 is a multiple-section operation train, this is repeated for each of the vehicle-formation-sets forming the train 2. Additionally, when the train 2 is a multiple-section operation train, and the train information is obtained from the on-board apparatuses 200 of all of the vehicle-formation-sets forming the train 2, the vehicle-formation-set IDs of children vehicle-formation-sets are deleted from the train list 573, while leaving only the vehicle-formation-set ID of the parent vehicle-formation-set.

The multiple-section train information generation unit 527 generates multiple-section train information by arranging, in the order of coupling to the parent vehicle-formation-set, the vehicle-formation-set IDs of the children vehicle-formation-sets that are deleted from the train list 573 by the leaving train registration unit 526. Then, the generated multiple-section train information is transmitted to the on-board apparatus (i.e., the parent apparatus) 200 of the parent vehicle-formation-set.

When the leaving of the train 2 from the building 40 is not proper, specifically, when failing to obtain the train information from the on-board apparatus 200 mounted on the vehicle-formation-set forming the train 2, the alarm output control unit 528 performs the alarm output control indicating the failure, so as to report the failure to the attendant. This alarm output control includes the processing for displaying an alarm message indicating a leaving abnormality on a display unit 54, the processing for causing the sound output of an alarm sound indicating the leaving abnormality from a sound output unit 55, etc.

The operation unit 53 is realized by input apparatuses such as various switches such as a button switch, a lever switch, and a dial switch, and a touch panel, receives the various operation inputs such as the train start operation by the attendant, and outputs, to the ground control unit 52, an operation signal in accordance with the operation input.

The display unit 54 is realized by a display apparatus such as an LCD and an EL display, and displays various screens based on a display signal that is input from the ground control unit 52.

The sound output unit 55 is a apparatus for emitting sound based on a sound signal that is output from the ground control unit 52, and is a speaker.

The ground communication unit 56 is a wired or wireless communication apparatus realized by, for example, a wireless communication module, a router, a modem, a TA, a jack for a wired communication cable, a control circuit, etc., and communicates with an external apparatus.

The ground memory unit 57 is realized by a storage medium such as an IC memory, a hard disk, and an optical disk. A program for operating the ground apparatus 500 to realize a variety of functions that the ground apparatus 500 includes, data used during the execution of the program, etc. are stored in this ground memory unit 57. In this embodiment, a ground program 571, an own apparatus ID 572, a train list data (train list) 573, a storage list data (storage list) 574, and management target train information 575 are stored in the ground memory unit 57.

The ground control unit 52 reads and executes the ground program 571 from the ground memory unit 57, thereby realizing the functions of the on-rail detection processing unit 521, the entering storage management unit 522, the leaving storage management unit 524, etc. The ground apparatus ID of the ground apparatus 500 is set to the own apparatus ID 572.

The train ID of the management target train 2 is set to the train list 573. The storage list 574 is prepared for each storage track number. The vehicle-formation-sets ID of the vehicle-formation-sets that have entered the building 40 from the relevant storage track 50, and have not left yet are set to each storage list 574 in the entering order of the vehicle-formation-sets.

The management target train information 575 stores the traveling position, the travel speed, etc. of the management target train 2 identified as a result of the polling communication. For example, the management target train information 575 is prepared for each train ID of the management target train 2, and is set as a reception history of the train information received (obtained) from the relevant train 2 until the last polling communication.

2. On-Train Device

Figure 10:
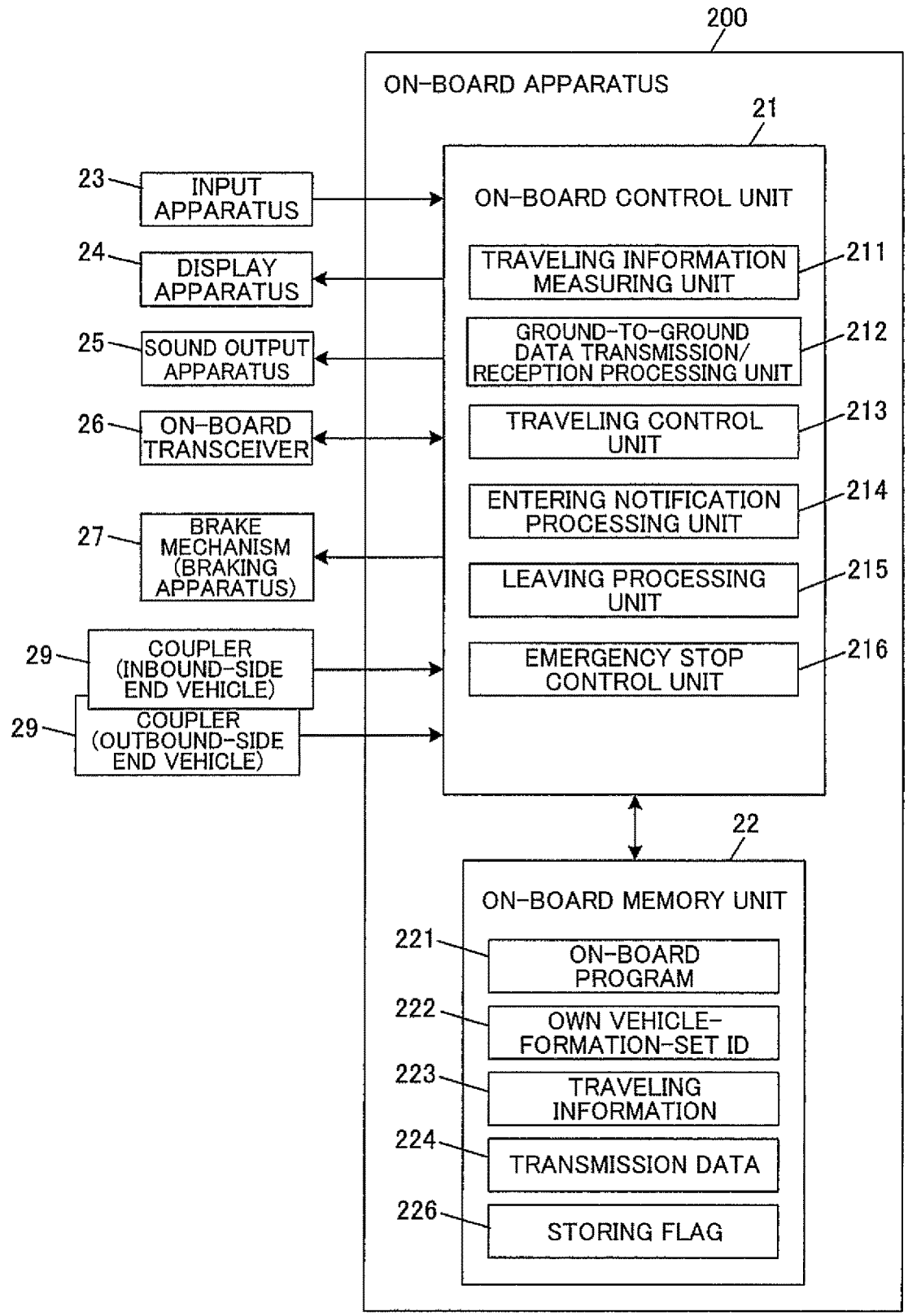
FIG. 10 is a block diagram illustrating a functional configuration example of an on-board apparatus.

FIG. 10 is a block diagram illustrating a functional configuration example of the on-board apparatus 200. As illustrated in FIG. 10, the on-board apparatus 200 is a kind of computer control apparatus formed by including an on-board control unit 21 and an on-board memory unit 22, and is connected to an input apparatus 23, a display apparatus 24, a sound output apparatus 25, an on-board transceiver 26, a brake mechanism (braking apparatus) 27, a coupler 29 of each vehicle forming an own vehicle-formation-set, etc.

The on-board control unit 21 is formed by including an arithmetic apparatus or an arithmetic circuit, such as a CPU and a FPGA, and generally controls the operation of the on-board apparatus 200 by giving instructions to and transferring data to each of the units forming the on-board apparatus 200, based on the program and data stored in the on-board memory unit 22, the data received from the ground apparatus 500, etc. This on-board control unit 21 includes a traveling information measuring unit 211, a ground-to-ground data transmission/reception processing unit 212, a traveling control unit 213, an entering notification processing unit 214, a leaving processing unit 215, and an emergency stop control unit 216. When the vehicle-formation-set on which the on-board apparatus 200 is mounted is operating as a vehicle-formation-set train, all of the function units 211 to 216 perform processing. On the other hand, when the vehicle-formation-set forms a multiple-section operation train, in the case where the on-board apparatus 200 serves as the parent apparatus, i.e., the case where it is the on-board apparatus 200 mounted on the vehicle-formation-set closer to the track end of the rail yard 30 out of the vehicle-formation-sets forming the multiple-section operation train, all of the function units 211 to 216 perform processing. Meanwhile, when it is the on-board apparatus 200 mounted on the vehicle-formation-set other than the vehicle-formation-set closer to the track end, only in the case where the multiple-section operation train leaves the building 40, the ground-to-ground data transmission/reception processing unit 212 and the leaving processing unit 215 perform processing. Each function unit that the on-board control unit 21 includes may be realized by an individual arithmetic circuit, or may be individually realized by software-based arithmetic processing by the arithmetic circuit.

The traveling information measuring unit 211 determines the rotation speed of an axle shaft based on a detection signal of a speed generator that outputs the detection signal in accordance with the rotation speed of the axle shaft, and measures the traveling position (traveling distance expressed in kilometers) and travel speed of the train whenever necessary. Additionally, instead of the measurement based on the detection signal of the speed generator, or together with the measurement based on the detection signal of the speed generator, the traveling position and travel speed of the train may be measured using a measurement value by a satellite positioning system, such as a GPS (Global Positioning System).

The ground-to-ground data transmission/reception processing unit 212 performs the control of receiving, via the on-board transceiver 26, the ground information transmitted from the ground apparatus 500 by the polling communication in commercial operation, the destination train ID of the ground information being the own vehicle-formation-set ID 222. Then, upon reception, the control is performed in which the train information, including transmission data 224 in which its originator ground apparatus ID D12 is set to the destination ground apparatus ID, and the own vehicle-formation-set ID 222 is set to the originator train ID, is generated and transmitted via the on-board transceiver 26.

The traveling control unit 213 performs traveling control of the train in accordance with the traveling control information such as the coming-in allowable range received from the counterpart ground apparatus, in addition to ground apparatus 500. The traveling control itself can be realized by using a known art, and controls the traveling of the train in accordance with a speed check pattern in which stopping at a stop position corresponding to the coming-in allowable range occurs, for example.

The entering notification processing unit 214 informs the ground apparatus 500 of the entering of the train into the building 40 by turning the building entry notification flag of the train information "ON", when the train 2 enters the building 40.

The leaving processing unit 215 monitors whether or not there is the polling communication with the ground apparatus 500 when the train 2 leaves the building 40, and performs setting of necessary data, etc.

The emergency stop control unit 216 monitors whether or not there is the near field communication performed with the balise 63 when the vehicle-formation-set train passes through a position in the vicinity of the balise 63 when the train 2 leaves the building 40, and performs the emergency stop control when there is no polling communication with the ground apparatus 500 by the time the near field communication is performed. This emergency stop control includes, in addition to the control of actuating an emergency brake by actually driving the brake mechanism 27, the processing for displaying a message instructing an emergency stop to a driver on the display apparatus 24, the processing for causing the sound output apparatus 25 to perform the sound output of an informing sound instructing the same, etc.

The on-board memory unit 22 is realized by a storage medium such as an IC memory, a hard disk, and an optical disk. A program for operating the on-board apparatus 200 to realize a variety of functions that the on-board apparatus 200 includes, data used during the execution of the program, etc., are stored in this on-board memory unit 22 in advance, or temporarily stored in this on-board memory unit 22 every time processing is performed. In this embodiment, an on-board program 221, an own vehicle-formation-set ID 222, traveling information 223, transmission data 224, and a storing flag 226 are stored in the on-board memory unit 22.

The on-board control unit 21 reads and executes the on-board program 221 from the on-board memory unit 22, thereby realizing the functions of the traveling information measuring unit 211, the ground-to-ground data transmission/reception processing unit 212, the traveling control unit 213, the entering notification processing unit 214, the leaving processing unit 215, the emergency stop control unit 216, etc.

The vehicle-formation-set ID of the own vehicle-formation-set used as the train ID is set as the own vehicle-formation-set ID 222.

The traveling information 223 includes the traveling position and travel speed of the train that are rewritten whenever necessary with the newest traveling position and travel speed measured by the traveling information measuring unit 211 whenever necessary.

The transmission data 224 is transmitted by the ground-to-ground data transmission/reception processing unit 212 in accordance with the format illustrated in FIG. 3, or the leaving processing unit 215 updates and stores the transmission data to be included in the train information to be transmitted whenever necessary. The transmission data 224 includes the train position information, the coupling flag, the track end side coupling flag, the multiple-section train information, the entry storage track number, the building entry notification flag, etc., as explained and illustrated in FIG. 3, for example. In this transmission data 224, the newest traveling position that is set to the traveling information is set to the train position information whenever necessary.

The storing flag 226 is the flag information indicating whether or not the train 2 related to the train information is in the building 40. "ON" is set to this storing flag 226 at the time of completion of entering of the train 2 into the building 40, and "OFF" is set to this storing flag 226 at the time of completion of leaving of the train 2 from the building 40.

Flow of Processing

Hereinafter, a description is given of the flow of processing of the ground apparatus 500 and the on-board apparatus 200 in this embodiment. Note that the processing described below is realized by the ground control unit 52 in the ground apparatus 500 by reading and executing the ground program 571 from the ground memory unit 57, and by the on-board control unit 21 in the on-board apparatus 200 by reading and executing the on-board program 221 from the on-board memory unit 22.

Figure 11:
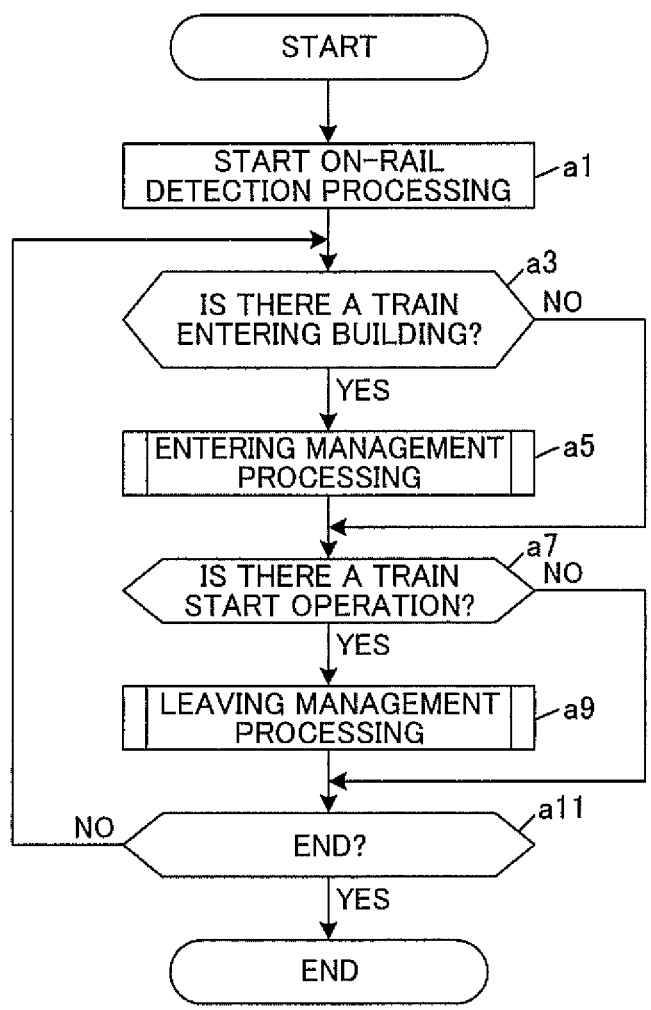
FIG. 11 is a flowchart illustrating the flow of entire processing of the ground apparatus.
Figure 12:
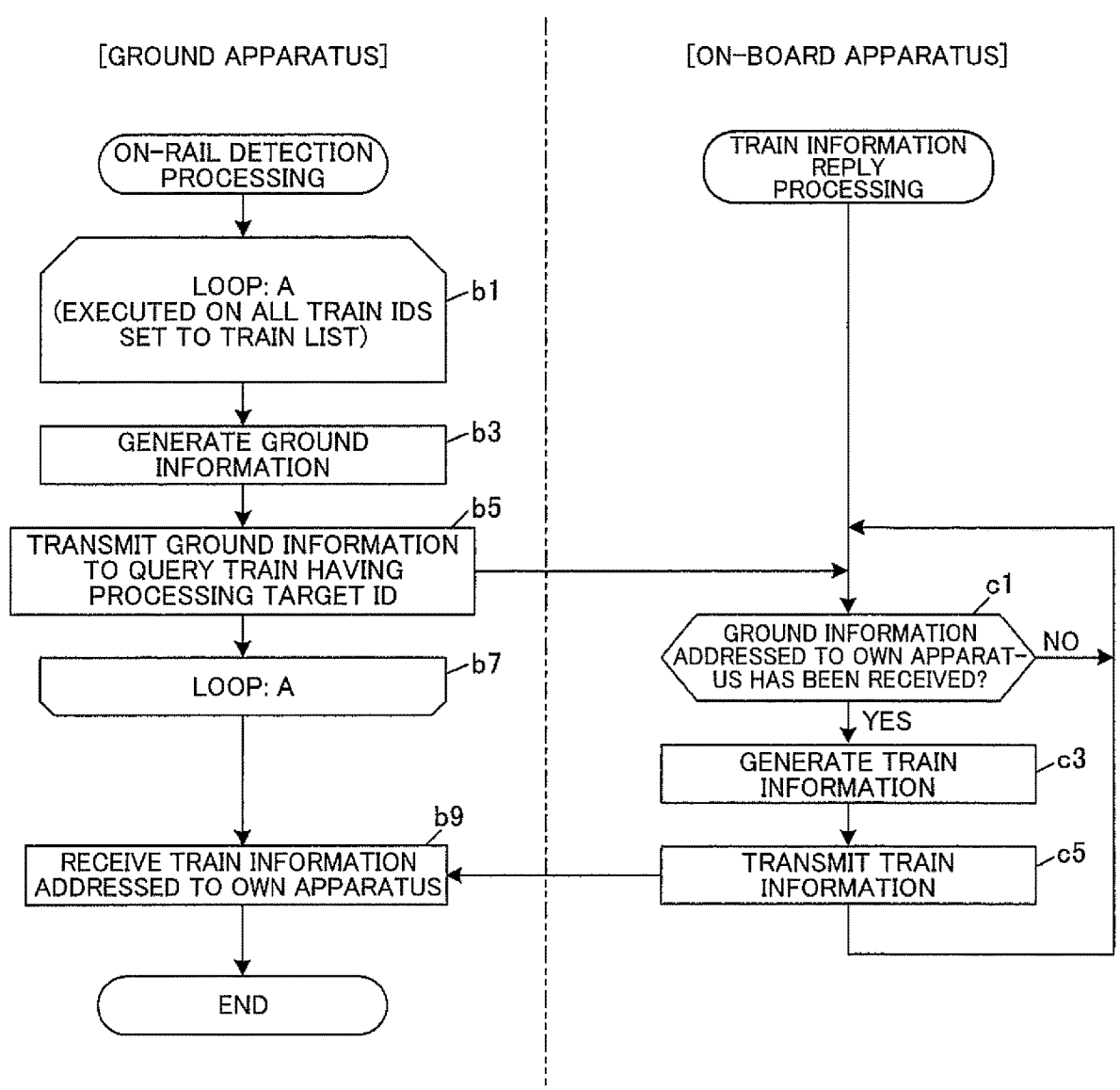
FIG. 12 is a flowchart illustrating the flow of on-rail detection processing of the ground apparatus and the flow of train information reply processing of the on-board apparatus accompanying the on-rail detection processing.

First, referring to FIG. 11, a description is given of the flow of entire processing performed by the ground apparatus 500. First, the on-rail detection processing unit 521 starts on-rail detection processing (step a1). FIG. 12 is a flowchart illustrating the flow of the on-rail detection processing and the flow of train information reply processing of the on-board apparatus 200 accompanying the on-rail detection processing. The ground apparatus 500 repeatedly performs the on-rail detection processing illustrated in FIG. 12 in predetermined inquiry period.

In the on-rail detection processing, the on-rail detection processing unit 521 repeats the processing of loop A by sequentially using all of the train IDs that are set to the train list 573 as processing target IDs, and performs the polling communication once (step b1 to step b7). That is, the on-rail detection processing unit 521 generates the ground information to be transmitted to the relevant train 2 by using the processing target IDs as the destination train IDs, and using the own apparatus ID 572 as the originator ground apparatus ID (step b3). The ground information can include the traveling control information of the relevant train 2. Then, the on-rail detection processing unit 521 transmits the generated ground information via the wireless base station 51, thereby inquiring the train 2 having the processing target ID (step b5).

Whenever there is this inquiry, in the on-board apparatus 200, the ground-to-ground data transmission/reception processing unit 212 performs the train information reply processing. That is, the ground-to-ground data transmission/reception processing unit 212 performs control of receiving the ground information addressed to the train from the ground apparatus 500. Then, when there is the polling communication by the ground apparatus 500, and the ground information addressed to the train is received (step c1: YES), the ground-to-ground data transmission/reception processing unit 212 generates the train information including the transmission data 224, by using the originator ground apparatus ID of the received ground information as the destination ground apparatus ID, and using the own vehicle-formation-set ID 222 as the originator train ID (step c3). Then, the ground-to-ground data transmission/reception processing unit 212 transmits the generated train information via the on-board transceiver 26 (step c5).

On the other hand, in the ground apparatus 500, the on-rail detection processing unit 521 performs control of receiving the train information (step b9). When the train information can be obtained from all of the trains 2 that are the management targets, the polling communication related to the inquiry period this time is ended.

Figure 13:
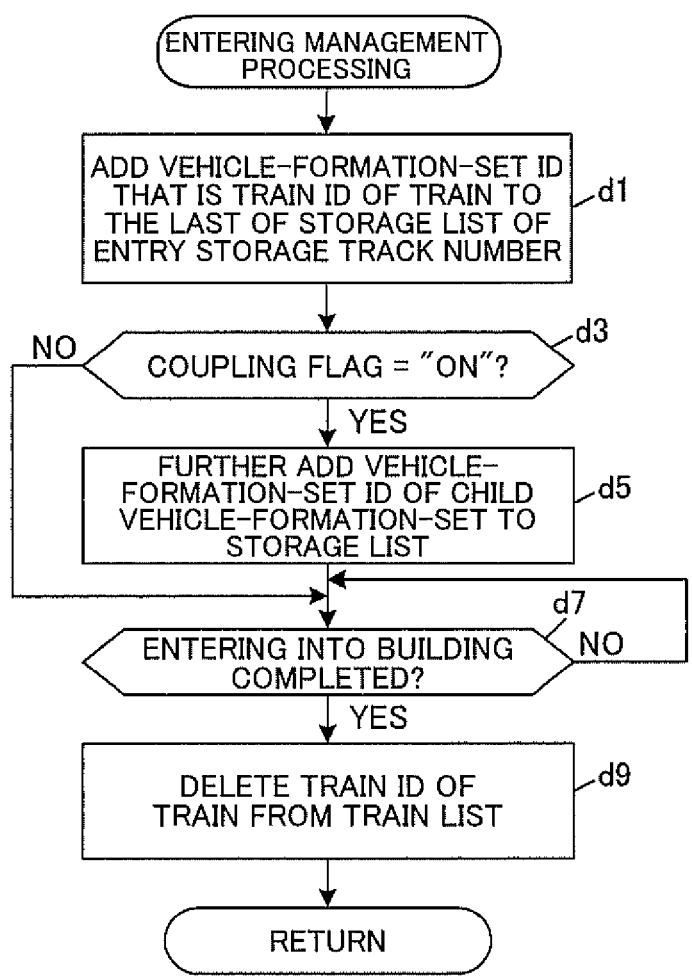
FIG. 13 is a flowchart illustrating the flow of entering management processing.

Refer to FIG. 11 again. After starting the on-rail detection processing in step a1, the train 2 entering the building 40 is monitored based on the building entry notification flag of the train information obtained from the train 2 that is the management target by the polling communication. Then, when the train information whose building entry notification flag is "ON" is obtained (step a3: YES), the entering management unit 522 performs entering management processing based on the obtained train information (step a5). FIG. 13 is a flowchart illustrating the flow of the entering management processing.

First, the entering management unit 522 adds the vehicle-formation-set ID that is set as the originator train ID (it is the train ID of the train 2) to the last of the storage list 574 of the entry storage track number (step dl).

Next, the entering management unit 522 distinguishes the coupling flag. Then, when the coupling flag is "OFF" (step d3: NO), the processing shifts to step d7. On the other hand, when the coupling flag is "ON" (step d3: YES), the entering management unit 522 further adds the vehicle-formation-set ID of the child vehicle-formation-set to the last of the storage list 574 in accordance with the multiple-section train information D26 (step d5).

Thereafter, when the relevant train 2 actually enters the building 40, the entering to the building 40 is completed, and consequently, the wireless communication with the on-board apparatus (parent apparatus) 200 is disrupted (step d7: YES), the vehicle-formation-set ID (the train ID of the train 2) added to the storage list 574 in step dl is deleted from the train list 573 (step d9). The completion of entering of the train 2 into building 40 can be determined when, for example, there is no reply of the train information from the train 2 in response to the polling communication for a predetermined time.

Figure 14:
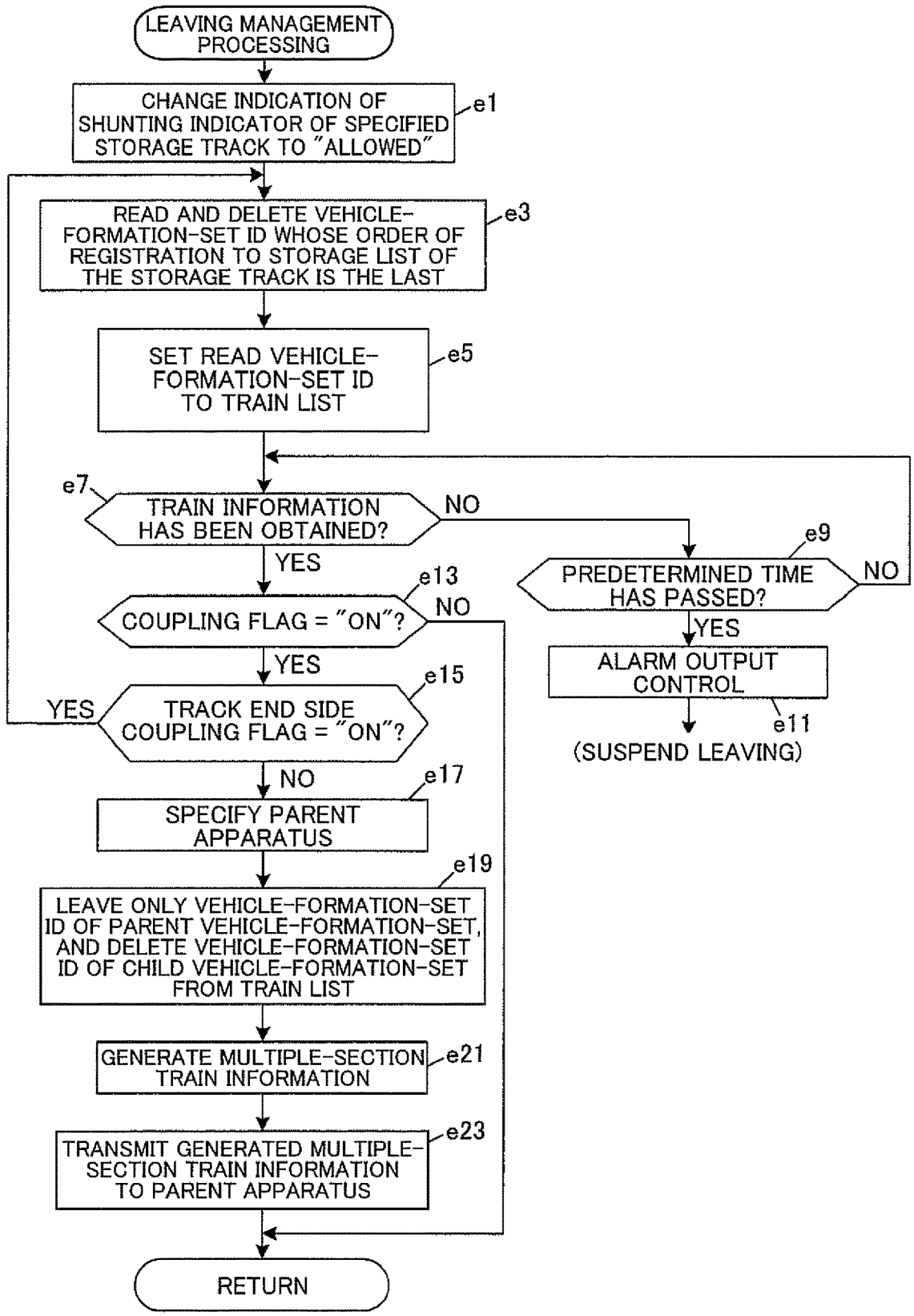
FIG. 14 is a flowchart illustrating the flow of leaving management processing.

Refer to FIG. 11 again. In a subsequent step a7, the input of the train start operation is monitored. This train start operation is a leaving instruction for the train 2 from the building 40 performed by specifying the storage track 50. When the train start operation is input (step a7: YES), the leaving management unit 524 performs leaving management processing (step a9). FIG. 14 is a flowchart illustrating the flow of the leaving management processing.

First, the shunting indicator control unit 525 changes the indication of the shunting indicator 65 of the storage track 50 specified by the train start operation to "allowed" (step e1). Then, the leaving train registration unit 526 reads and deletes (cancels registration), from the storage list 574, the vehicle-formation-set ID whose order of registration is last and that is registered in the storage list 574 of the specified storage track 50 (step e3), and sets the read vehicle-formation-set ID to the train list 573 as the train ID (step e5). As a result of the processing here, the ground information will be transmitted to the on-board apparatus 200 of the relevant vehicle-formation-set in the on-rail detection processing in FIG. 12.

Subsequently, the leaving management unit 524 judges whether or not the train information is successfully obtained from the on-board apparatus 200. The processing here is performed by judging whether or not the train information having, as the originator train ID, the vehicle-formation-set ID that is set to the train list 573 in step e5 is received in step b9 of FIG. 12. When it is received, the train information is successfully obtained (step e7: YES), and the processing shifts to step e13. When it is not received (step e7: NO), and a predetermined time has passed (step e9: YES), the alarm output control unit 528 performs the alarm output control (step e11).

Then, in step e13, the leaving management unit 524 distinguishes the coupling flag of the received train information, and when the coupling flag is "OFF" (step e13: NO), the leaving management processing ends. On the other hand, when the coupling flag is "ON" (step e13: YES), the track end side coupling flag is distinguished. When the track end side coupling flag is "ON" (step e15: YES), the processing returns to step e3. On the other hand, when the track end side coupling flag is "OFF" (step e15: NO), the processing shifts to step e17.

Then, in step e17, the leaving management unit 524 specifies the originator train ID of the received train information as the originator train ID of a parent vehicle-formation-set, and sets the on-board apparatus 200 of the parent vehicle-formation-set to be a parent apparatus. In this case, the leaving train registration unit 526 leaves only the vehicle-formation-set ID of the parent vehicle-formation-set, and deletes, from the train list 573, the vehicle-formation-set IDs of the children vehicle-formation-sets, which are the originator train IDs of the train information previously received, when the train 2 leaves (step e19).

Additionally, the multiple-section train information generation unit 527 generates the multiple-section train information by arranging the vehicle-formation-set IDs of the children vehicle-formation-sets in the reverse order of the receiving order of the train information (step e21). Then, the multiple-section train information generation unit 527 transmits, to the parent apparatus 200, the multiple-section train information generated by setting the vehicle-formation-set ID of the parent vehicle-formation-set as the address (step e23).

Refer to FIG. 11 again. After that, the processing returns to step a3 and repeats the processing described above, until the end of this processing such as at the time of shutdown, etc. (step a11: NO).

Figure 15:
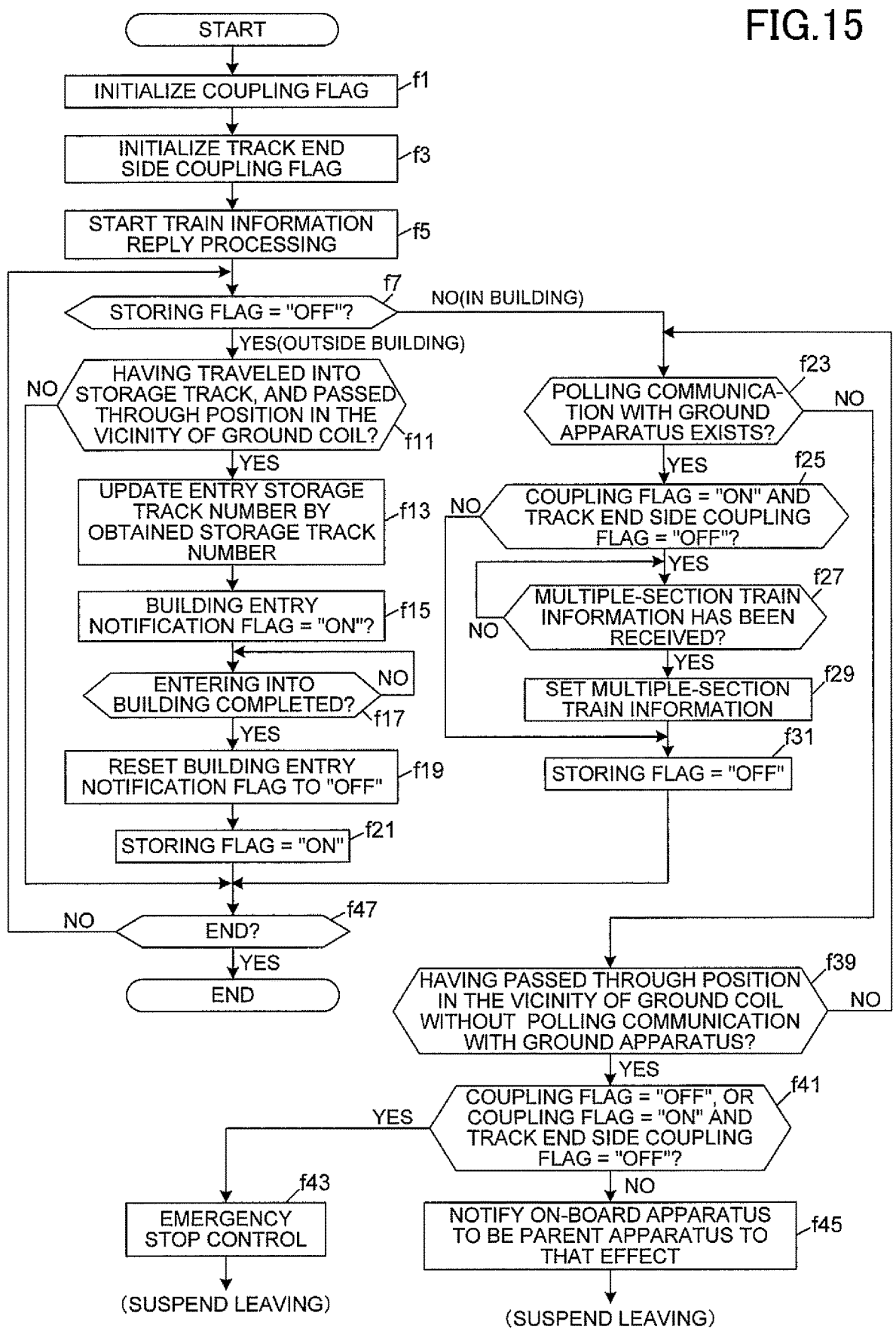
FIG. 15 is a flowchart illustrating the flow of entire processing of the on-board apparatus.

Next, referring to FIG. 15, a description is given of the flow of entire processing performed by the on-board apparatus 200. The on-board apparatus 200 starts the processing illustrated in FIG. 15 at the time of activation of the train. That is, when the on-board apparatus 200 is initiated by turning on the vehicle's power, first, the on-board control unit 21 distinguishes whether or not other vehicle-formation-set has been coupled, performs initialization by turning the coupling flag "ON" when there is the coupling, and turning the coupling flag "OFF" when there is no coupling, and updates the transmission data 224 (step f1). Additionally, the on-board control unit 21 also initializes the track end side coupling flag, and updates the transmission data 224 (step f3). When other vehicle-formation-sets are coupled closer to the track end of the rail yard 30, the track end side coupling flag is turned "ON", and when other vehicle-formation-sets are coupled to the opposite side of the closer-to-the-track-end side, or when the coupling flag is "OFF", the track end side coupling flag is turned "OFF."

Next, the ground-to-ground data transmission/reception processing unit 212 starts the train information reply processing illustrated in FIG. 12 (step f5). In accordance with the traveling control information received by the train information transmission processing started here, the traveling control unit 213 will control the traveling of the train. However, the traveling control is not performed when the own vehicle-formation-set is a child vehicle-formation-set. The traveling control unit 213 performs the traveling control when the coupling flag of the transmission data 224 is "OFF" (in the case of a vehicle-formation-set train), or when the coupling flag is "ON" and the track end side coupling flag is "OFF" (when the own vehicle-formation-set is a parent vehicle-formation-set). Then, the traveling control is actually started after there is an instruction to start the operation or after there is an instruction to leave, and follows the driver's operation.

Next, the on-board control unit 21 refers to the storing flag 226, and distinguishes whether the own vehicle-formation-set is in the building 40 or outside the building 40. Then, when the storing flag 226 is "OFF", and it is outside the building 40 (step f7: YES), the processing shifts to step f11. Then, when it travels into the storage track 50 in the process of subsequent traveling, and passes through a position in the vicinity of the balise 63 (step f11: YES), the on-board control unit 21 updates the transmission data 224 by setting the storage track number obtained from the balise 63 to the entry storage track number (step f13). Additionally, the transmission data 224 is also updated by turning the building entry notification flag "ON" (step f15).

Thereafter, when the train actually enters the building 40, the entering to the building 40 is completed, and consequently, the wireless communication with the ground apparatus 500 is disrupted (step f17: YES), the on-board control unit 21 updates the transmission data by resetting the building entry notification flag to "OFF" (step f19), and updates the storing flag 226 to "ON" (step f21). The entering of the train into the building 40 (the disruption of the wireless communication) can be determined when a predetermined time has passed without polling from the ground apparatus 500.

Next, when the train is in the building 40 (step f7: NO), the leaving processing unit 215 monitors whether or not there is the polling communication with the ground apparatus 500. Then, when there is the polling communication, i.e., when the ground information is received in step c1 of FIG. 12 in the train information reply processing started in step f5 (step f23: YES), the coupling flag and the track end side coupling flag of the transmission data 224 are judged. Then, when the coupling flag is "ON", and the track end side coupling flag is "OFF" (step f25: YES), it will be in a standby state until the multiple-section train information is received from the ground apparatus 500 (step f27: NO). This is because, when the own vehicle-formation-set is a parent vehicle-formation-set (when the own apparatus is the parent apparatus 200), the multiple-section train information is transmitted from the ground apparatus 500 in step e23 of FIG. 14. Then, when the multiple-section train information is received (step f27: YES), the leaving processing unit 215 updates the transmission data 224 by setting the received multiple-section train information (step f29). Thereafter, the leaving processing unit 215 updates the storing flag 226 to "OFF" (step f31), and the processing shifts to step f47.

On the other hand, when it passes through a position in the vicinity of the balise 63 without the polling communication with the ground apparatus 500 (step f39: YES), in the case where the coupling flag of the transmission data 224 is "OFF", or in the case where the coupling flag is "ON" and the track end side coupling flag is "OFF" (step f41: YES), the emergency stop control unit 216 performs the emergency stop control (step f43). On the other hand, when the coupling flag is "ON" and the track end side coupling flag is "ON" (step f41: NO), a notification to that effect is transmitted to the on-board apparatus 200 mounted on the vehicle-formation-set closer to the track end of the rail yard 30 among the vehicle-formation-sets forming the multiple-section operation train (step f45). The notification here can be realized by performing wireless communication by both on-board apparatuses 200 via the on-board transceivers 26.

Additionally, when the train operation on the day ends, or when performing shutdown such as when turning off the power for inspection of vehicles (step f47: YES), the processing ends.

As described above, according to this embodiment, when the train 2 enters the building 40 of the rail yard 30, the ground apparatus 500 can obtain the vehicle-formation-set IDs of the respective vehicle-formation-sets from the respective on-board apparatuses 200 mounted on the respective vehicle-formation-sets forming the train 2. Additionally, each of the obtained vehicle-formation-set IDs can be set to the storage list 574 of the storage track 50 to be traveled in the entering order into the building 40. On the other hand, when the train 2 leaves the building 40, it is possible to monitor the leaving order of each of the vehicle-formation-sets from the building 40 based on the IDs sequentially transmitted from the on-board apparatuses 200 of the respective vehicle-formation-sets forming the train 2 when the on-board apparatuses 200 leave from the building 40 to the outside. Further, it is possible to judge whether or not the leaving is proper based on whether the leaving order of the leaving vehicle-formation-sets follows the reverse order of the entering order of each of the vehicle-formation-sets indicated by the setting order of the vehicle-formation-set IDs in the storage list 574 of the relevant storage track 50. As a result, when it is judged that the leaving is not proper, the ground apparatus 500 performs the alarm output control for reporting it to the attendant, and the on-board apparatus 200 performs the emergency stop control to actuate the emergency brake, for example. According to this, it is possible to manage the entering and leaving of the train 2 into and from the building 40 for each vehicle-formation-set, and it is possible to securely and safely perform the train management.

Further, in the above-described embodiment, the on-board apparatus 200 of the vehicle-formation-set closer to the track end of the rail yard 30 among the vehicle-formation-sets forming the train 2 is used as the parent apparatus. However, the on-board apparatus 200 of the vehicle-formation-set closer to the opposite side of the closer-to-the-track-end side (the outbound side when the rail yard 30 is located on the inbound side) may be used as the parent apparatus. In this case, the ground apparatus 500 may specify the vehicle-formation-set that comes out from the building 40 first as the parent apparatus, when the multiple-section operation train whose coupling flag is "ON" leaves the building 40.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. An on-rail train management system comprising an on-board apparatus and a ground apparatus,
wherein wireless communication between the on-board apparatus and the ground apparatus being impossible or difficult when a train enters a building of a rail yard, but possible in commercial operation,
the train being formed by one or more vehicle-formation-sets,
the on-board apparatus
being mounted on each of the vehicle-formation-sets, and executing
storing IDs of the vehicle-formation-sets,
transmitting train information including the IDs of the vehicle-formation-sets to the ground apparatus in response to an inquiry from the ground apparatus, and
performing a predetermined emergency stop control when determining that there is not the inquiry from the ground apparatus after leaving the building, and
the ground apparatus executing,
when there is the train entering the building, storing the IDs of the respective vehicle-formation-sets of the train in an entering order by a FILO (First-In-Last-Out) method,
when there is the train leaving the building, sequentially reading the IDs by the FILO method, performing the inquiry based on the IDs in the order of the reading to obtain the train information from the on-board apparatus of each of the vehicle-formation-sets forming the train, and performing a predetermined alarm output control when the on-board apparatus does not respond to the inquiry, and obtaining of the train information fails.

2. The on-rail train management system according to claim 1, wherein, at the time of the commercial operation, out of the most inbound-side vehicle-formation-set forming the train and the most outbound-side vehicle-formation-set forming the train, the on-board apparatus of either one of the vehicle-formation-sets is defined as a parent apparatus, and the parent apparatus notifies the ground apparatus of the ID of each of the vehicle-formation-sets forming the train, in association with a coupling order of the vehicle-formation-sets, included in the train information together with position information of the train.

3. A ground apparatus of an on-rail train management system comprising an on-board apparatus and the ground apparatus, wireless communication between the on-board apparatus and the ground apparatus being impossible or difficult when a train enters a building of a rail yard, but possible in commercial operation, the train being formed by one or more vehicle-formation-sets, the on-board apparatus being mounted on each of the vehicle-formation-sets, and executing storing IDs of the vehicle-formation-sets, transmitting train information including the IDs of the vehicle-formation-sets to the ground apparatus in response to an inquiry from the ground apparatus, and performing a predetermined emergency stop control when determining that there is not the inquiry from the ground apparatus after leaving the building, when there is the train entering the building, storing the IDs of the respective vehicle-formation-sets of the train in an entering order by a FILO (First-In-Last-Out) method, when there is the train leaving the building, sequentially reading the IDs by the FILO method, performing the inquiry based on the IDs in the order of the reading to obtain the train information from the on-board apparatus of each of the vehicle-formation-sets forming the train, and performing a predetermined alarm output control when the on-board apparatus does not respond to the inquiry, and obtaining of the train information fails.

4. A train management method in an on-rail train management system comprising an on-board apparatus and a ground apparatus, wireless communication between the on-board apparatus and the ground apparatus being impossible or difficult when a train enters a building of a rail yard, but possible in commercial operation, the train being formed by one or more vehicle-formation-sets, the on-board apparatus being mounted on each of the vehicle-formation-sets, and storing IDs of the vehicle-formation-sets, the train management method comprising:

transmitting, by the on-board apparatus, train information including the IDs of the vehicle-formation-sets to the ground apparatus in response to an inquiry from the ground apparatus, when there is the train entering the building, storing, by the ground apparatus, the IDs of the respective vehicle-formation-sets of the train in an entering order by a FILO (First-In-Last-Out) method, when there is the train leaving the building, sequentially reading, by the ground apparatus, the IDs by the FILO method, performing the inquiry based on the IDs in the order of the reading to obtain the train information from the on-board apparatus of each of the vehicle-formation-sets forming the train, performing, by the ground apparatus, a predetermined alarm output control when the on-board apparatus does not respond to the inquiry and obtaining of the train information fails, and performing, by the on-board apparatus, a predetermined emergency stop control when determining that there is not the inquiry from the ground apparatus after leaving the building.

* * * * *